Feb. 24, 1953     H. MARTIN ET AL     2,629,131
APPARATUS FOR THE MANUFACTURE OF HOLLOW CAST ARTICLES
Filed Aug. 16, 1950     13 Sheets-Sheet 1
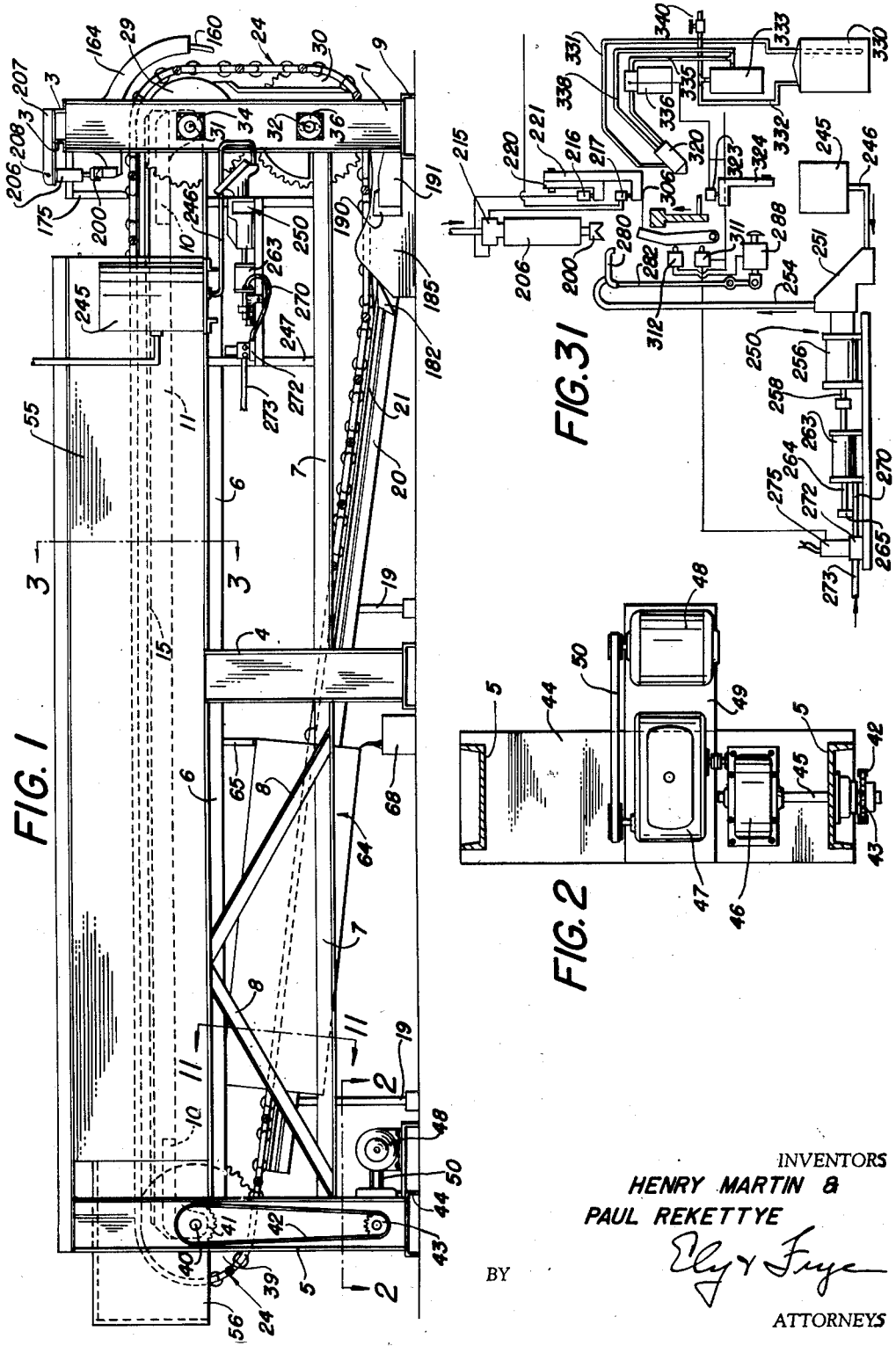
INVENTORS
HENRY MARTIN &
PAUL REKETTYE
BY    Ely & Frye
ATTORNEYS

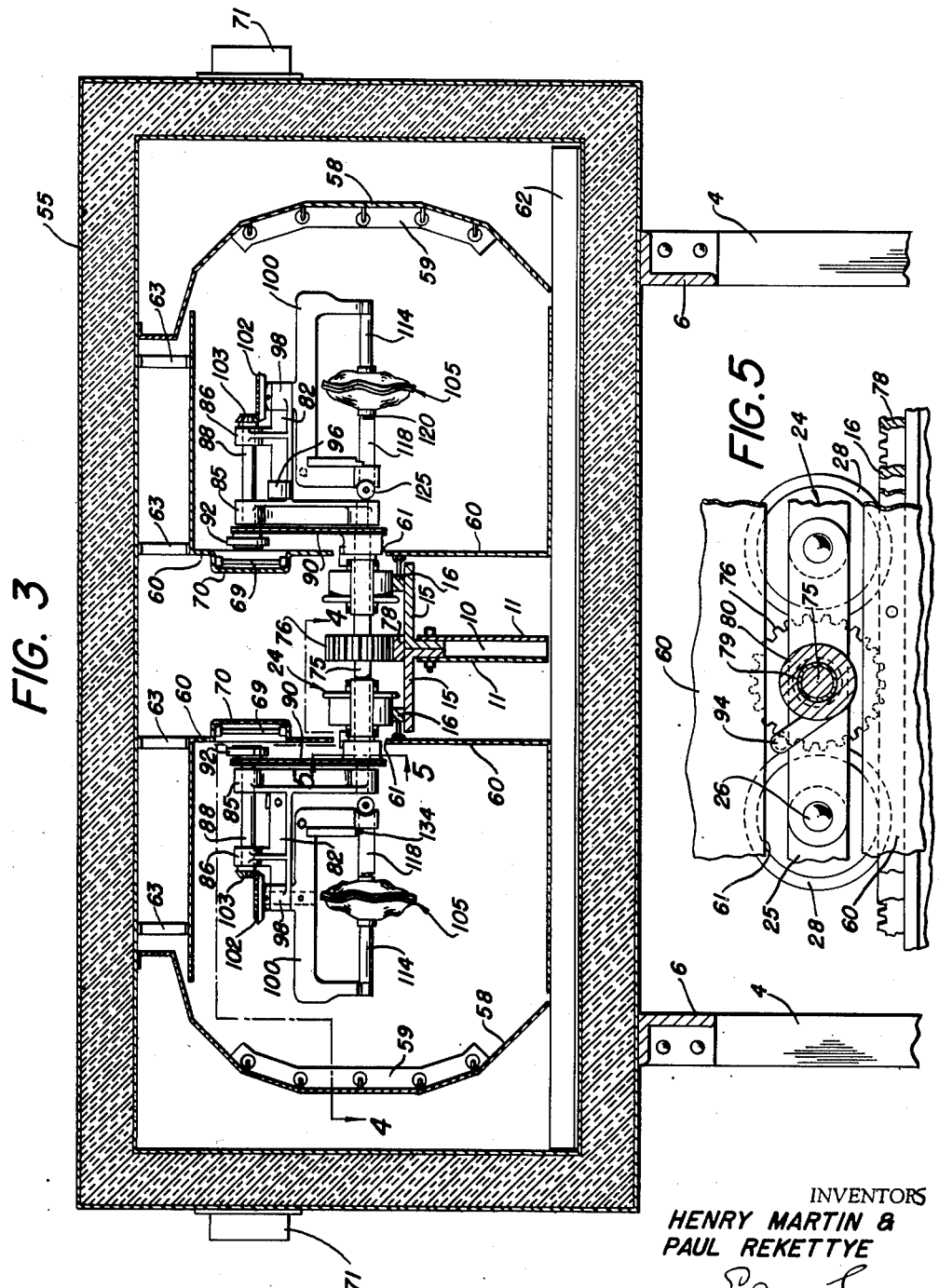

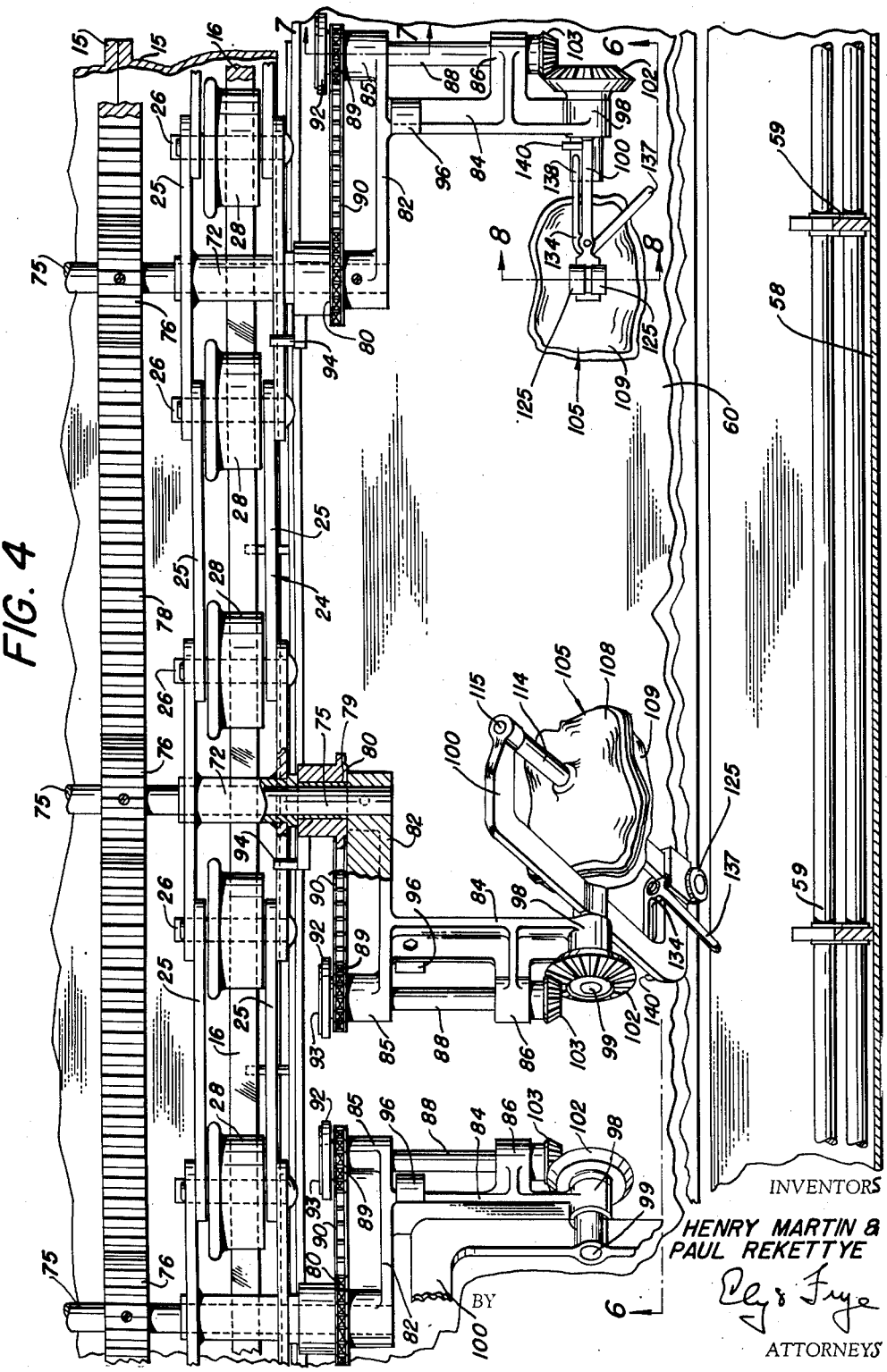

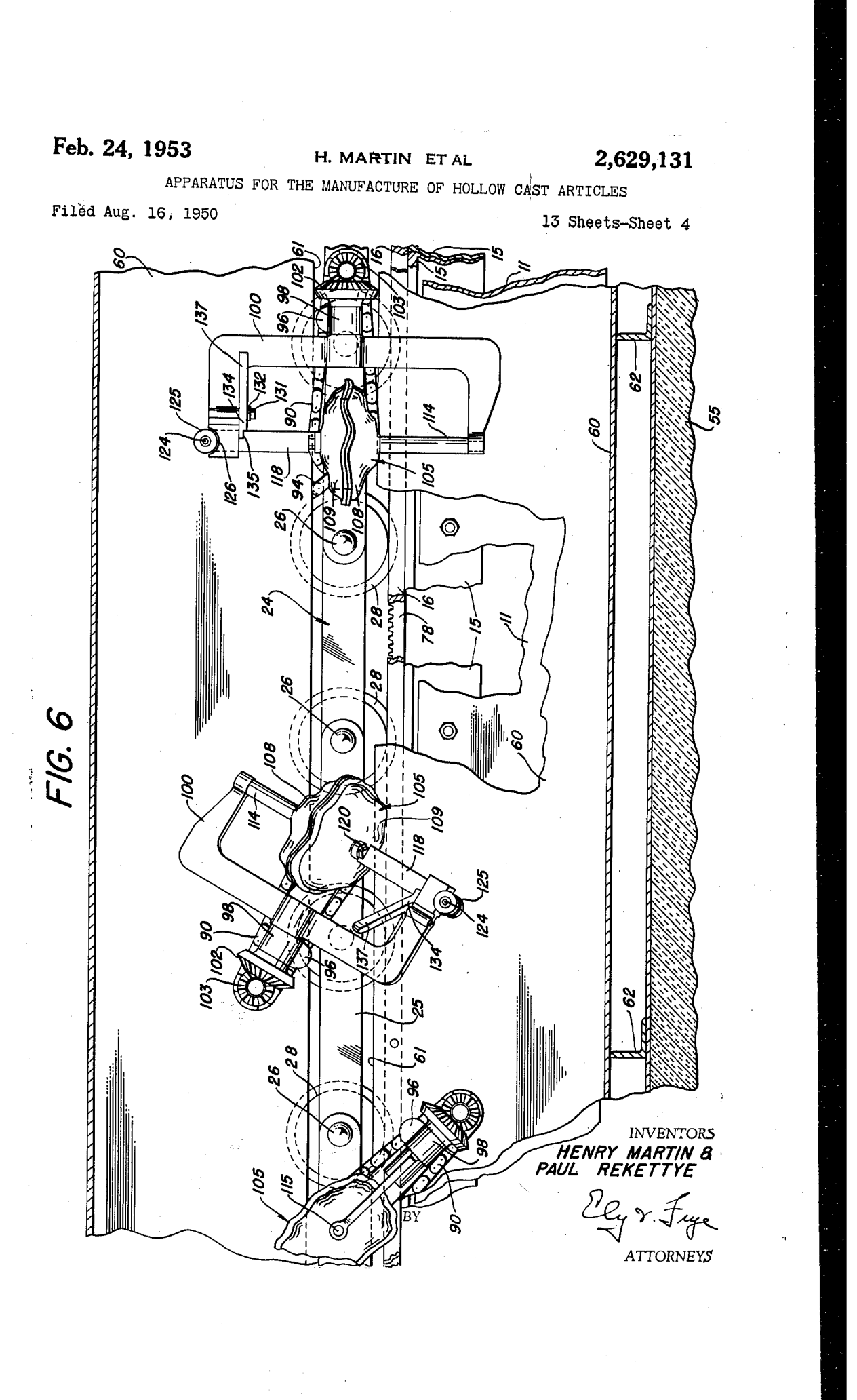

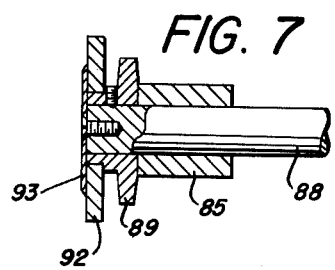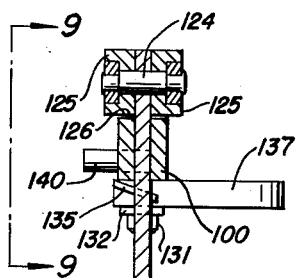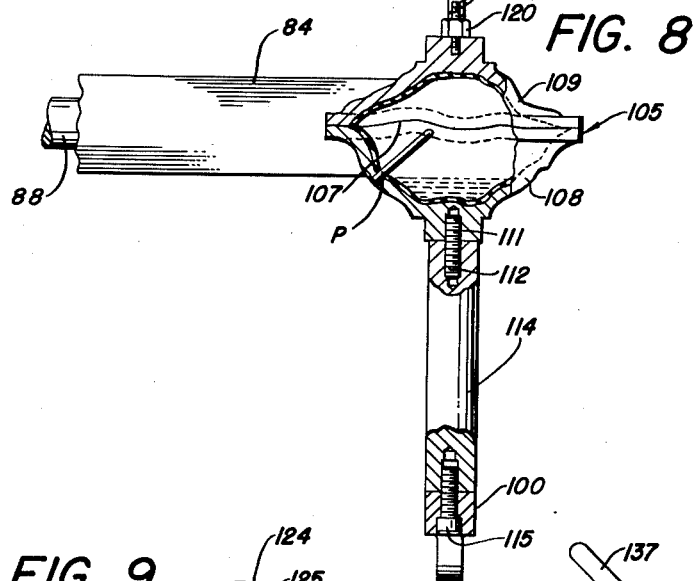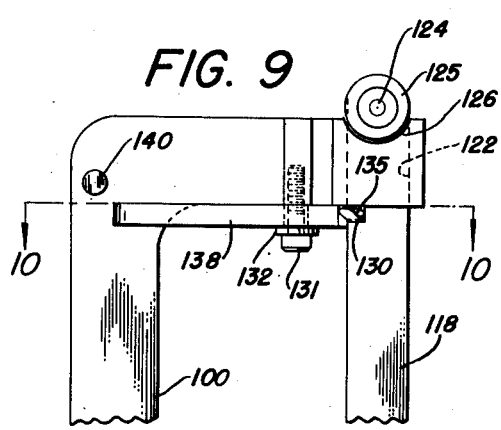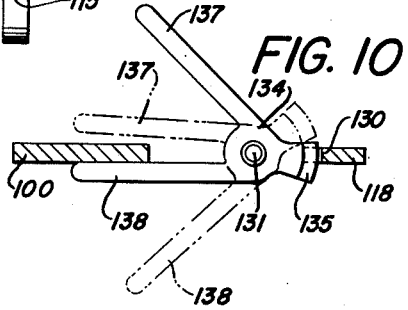

INVENTORS
HENRY MARTIN &
PAUL REKETTYE
BY
ATTORNEYS

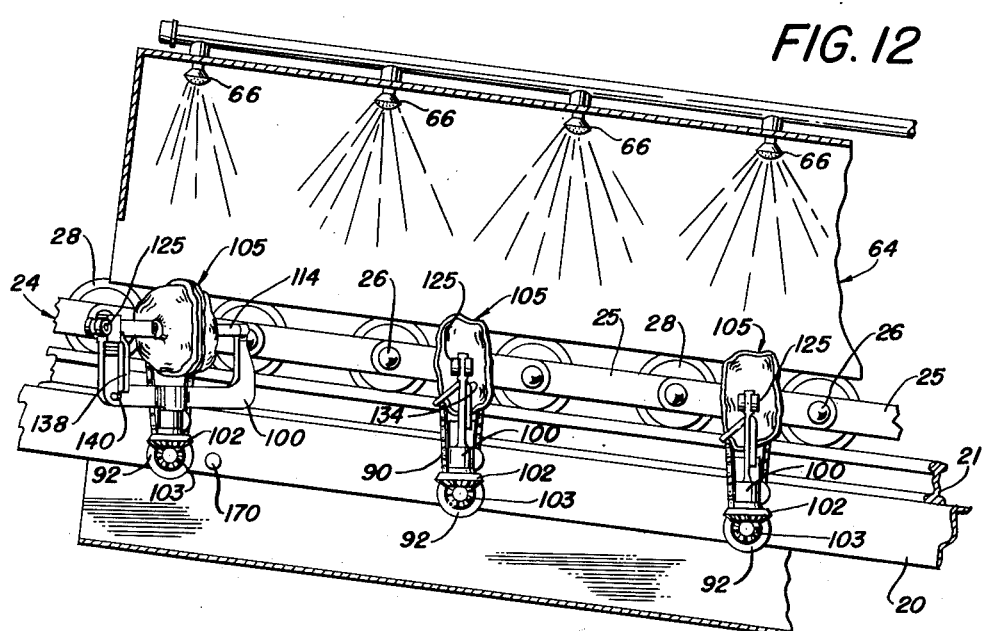
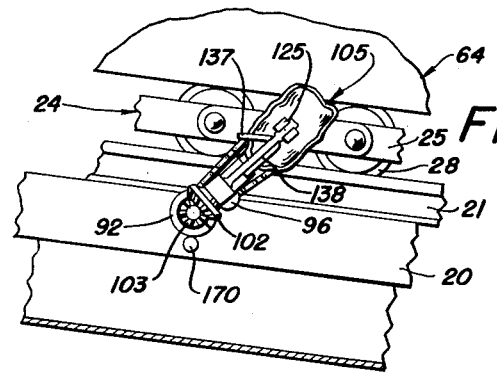
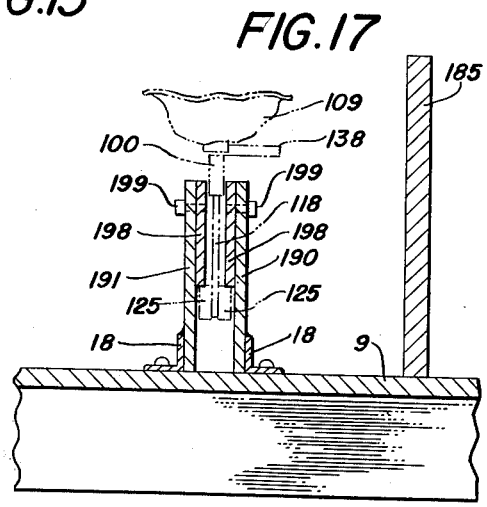
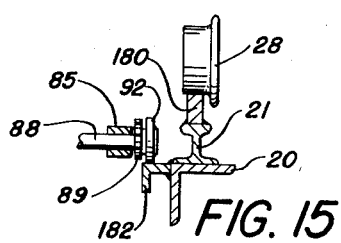

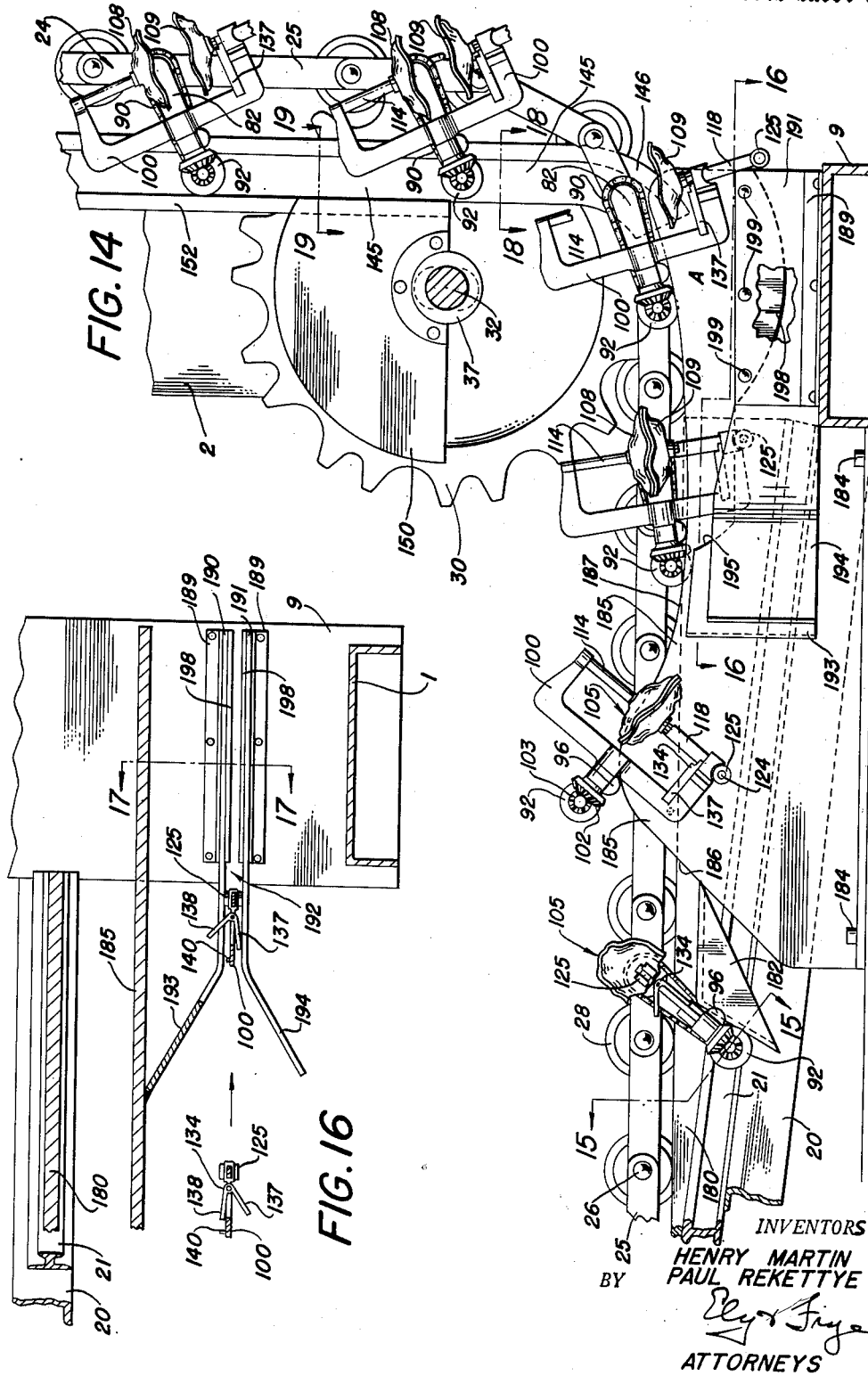

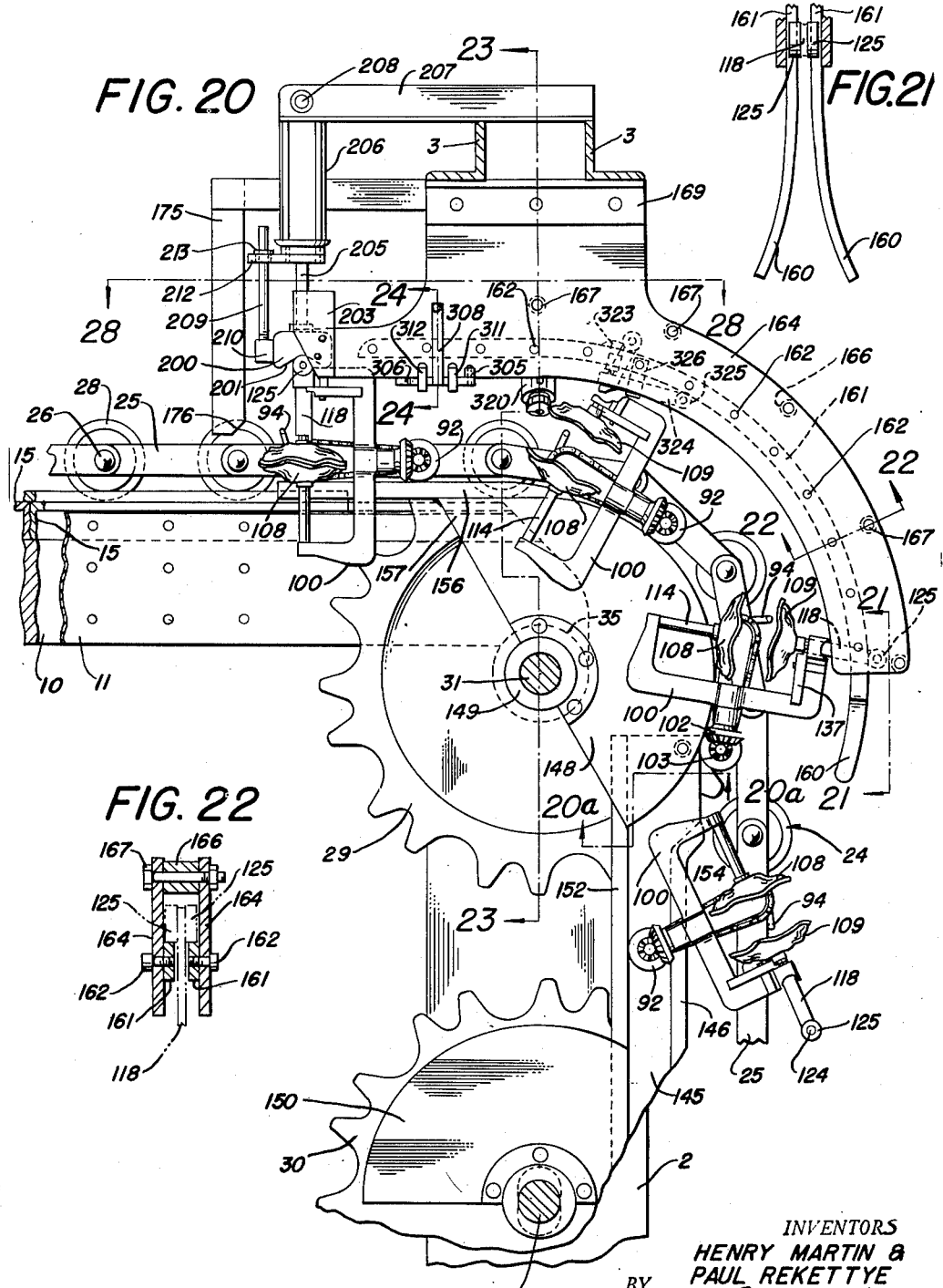

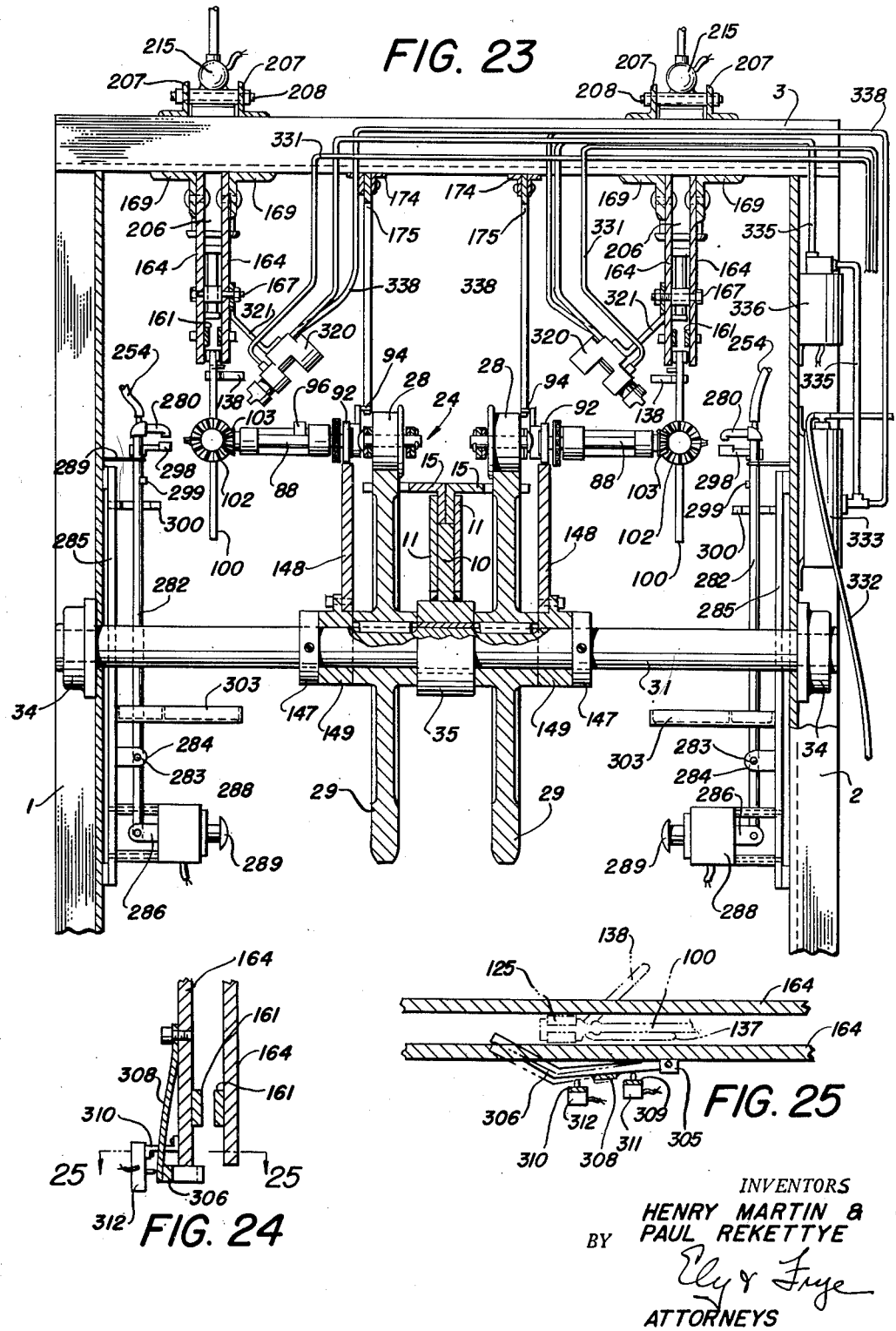

Feb. 24, 1953 H. MARTIN ET AL 2,629,131
APPARATUS FOR THE MANUFACTURE OF HOLLOW CAST ARTICLES
Filed Aug. 16, 1950 13 Sheets-Sheet 11

INVENTORS
HENRY MARTIN &
PAUL REKETTYE
BY
Ely & Frye
ATTORNEYS

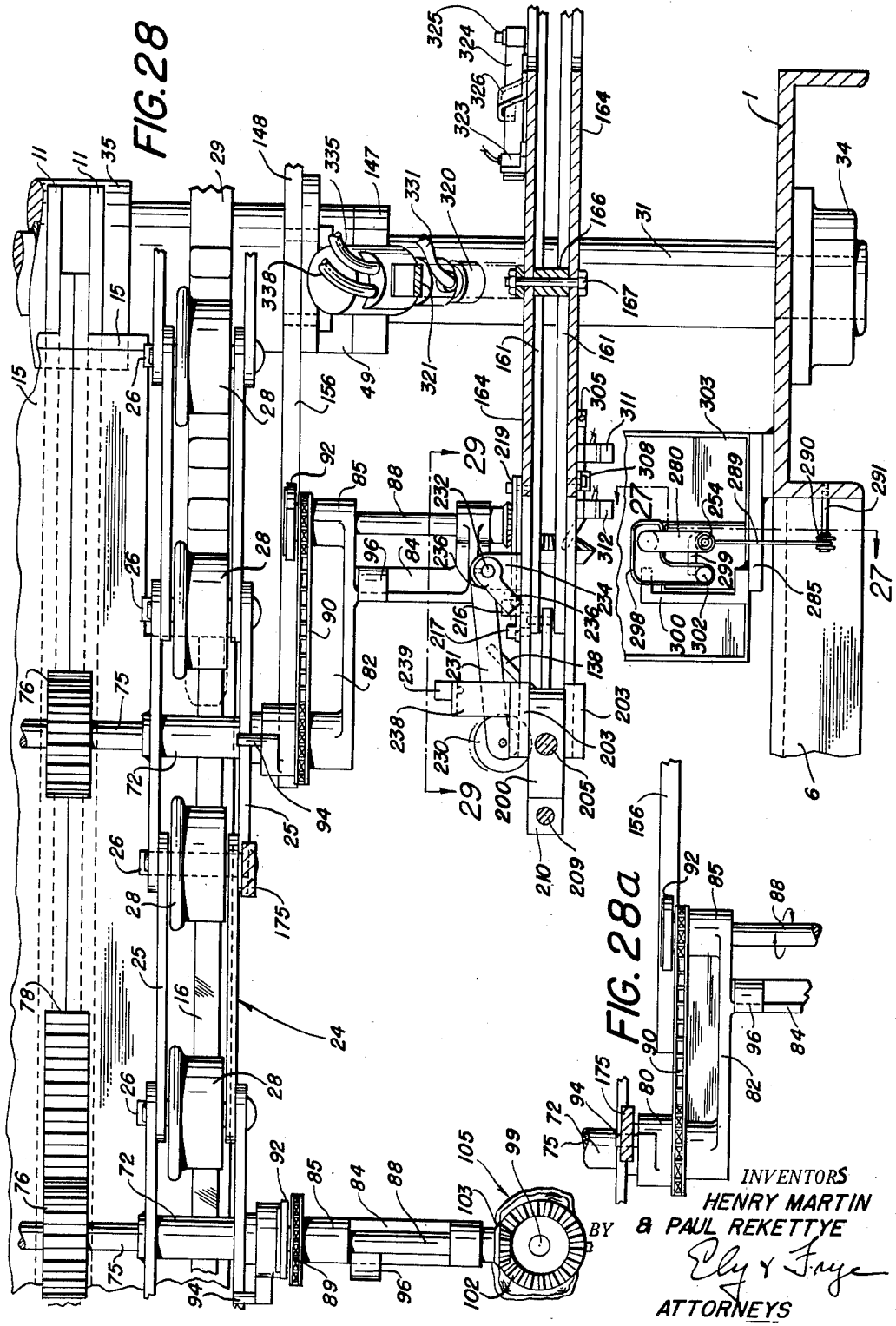

Patented Feb. 24, 1953

2,629,131

UNITED STATES PATENT OFFICE 2,629,131

APPARATUS FOR THE MANUFACTURE OF HOLLOW CAST ARTICLES

Henry Martin, Wadsworth, and Paul Rekettye, Akron, Ohio, assignors to The Sun Rubber Company, Barberton, Ohio, a corporation of Ohio Application August 16, 1950, Serial No. 179,726

33 Claims. (Cl. 18—26)

The present invention relates to apparatus for the manufacture primarily of hollow, flexible articles from plastic materials by what may be conveniently termed as an internal casting process. In the practice of this method generally, a hollow mold is loaded with a charge of a liquid plastic material and the mold is rotated upon itself in a plurality of planes so that the material covers the interior of the mold or matrix to a uniform extent. The liquid plastic will gel on the interior of the matrix during the distributing operation, so that a shell of uniform thickness is deposited on the interior of the mold. The gelled skin or shell is then brought to the fusing temperature of the plastic which finally forms the molded article. Various types of plastic materials or resins may be employed, but it is preferred in the operation of the machine shown and described herein to employ one of the numerous resins adapted for the purpose and to apply heat to the molds during their rotation, which will cause the liquid material to set as a skin or shell, the thickness of which depends upon the amount of the original charge placed in the mold, all of the charge of the material being used to make the shell. Vinyl resins which are polymers of vinyl chloride combined with suitable plasticizers are adaptable for the purpose and are readily available upon the market. Other materials suitable for the purpose may be used. It is possible also to utilize liquid materials which do not require the application of heat to set up and, with such materials, the heating and cooling of the molds may be omitted.

The apparatus is shown in its best known and preferred form, which is that which has been developed for the use of materials. However, changes and modifications may be made therein if necessary to adapt the principles of the invention to other materials.

The purpose of the invention is to devise a machine which, except for the removal of the finished product, is entirely automatic. All that is required is that the operator remove the hollow articles from the molds, which then travel to a point where a measured charge of the liquid material is deposited in one part of each mold as it passes the loading station. The molds are then closed tightly so that none of the liquid material will escape. After the molds are closed, they are started in rotation simultaneously on two axes, which distributes the charges over the inner surface of each mold and the molds then progress while in rotation through a heated oven, where they are subjected to sufficient heat to gel, and then to fuse the plastic material. Thence the molds pass through a cooling chamber. After leaving the cooling chamber, the molds are successively righted and are then acted upon by a device which first unlocks the molds and then opens them and they return to the starting point.

Machines of the general nature set forth above have been suggested in the prior art but none of them has proven satisfactory for rapid and efficient operation. The machine shown and described herein is automatic in its operation and requires a minimum of servicing and attention. It enables the rapid and extremely economical production of a large number of articles. It replaces old molding processes which are expensive and unsatisfactory in operation. The product is uniformly constant and few seconds or rejects are produced.

The preferred embodiment of the machine disclosed herein is intended for the manufacture of small hollow toys or dolls, the cheap and rapid production of which is one of the purposes of the invention. It may, however, be employed for the manufacture of all types of hollow articles which may be produced by the internal casting method as adapted to resinous and similar plastic materials.

While the machine is shown in great detail in order that the invention may be thoroughly understood, many details are not essential and changes, modifications, and improvements may be adopted within the scope of the invention as set forth in the claims appended hereto.

The method of preparing the vinyl chloride polymer and plasticizers, or other casting material, such as adapted for internal casting on this machine, and the process carried on, are the subject of a copending application of Robert P. Molitor, Serial No. 170,515, filed June 27, 1950.

In the drawings, in which the presently perfected and best known form of machine embodying the invention is shown:

Fig. 1 is a side elevation of a complete installation, the operator being stationed at the right hand end of the machine.

Fig. 2 is a plan view of the driving mechanism which propels the conveyer, this view being on the line 2—2 of Fig. 1.

Fig. 3 is a cross section through the heating and fusing or setting oven taken on the line 3—3 of Fig. 1.

Fig. 4 is an enlarged plan view of one side of the conveyer taken on the broken section line 4—4 in Fig. 3.

Fig. 5 is a section on the line 5—5 of Fig. 3.

Fig. 6 is a side elevation of the parts of the device shown in Fig. 4, this view being taken on the line 6—6 of Fig. 4.

Figs. 7 and 8 are details on the lines 7—7 and 8—8, respectively, of Fig. 4.

Fig. 9 is a detail of the matrix carrier on the line 9—9 of Fig. 8.

Fig. 10 is a section on the line 10—10 of Fig. 9.

Figure 11:
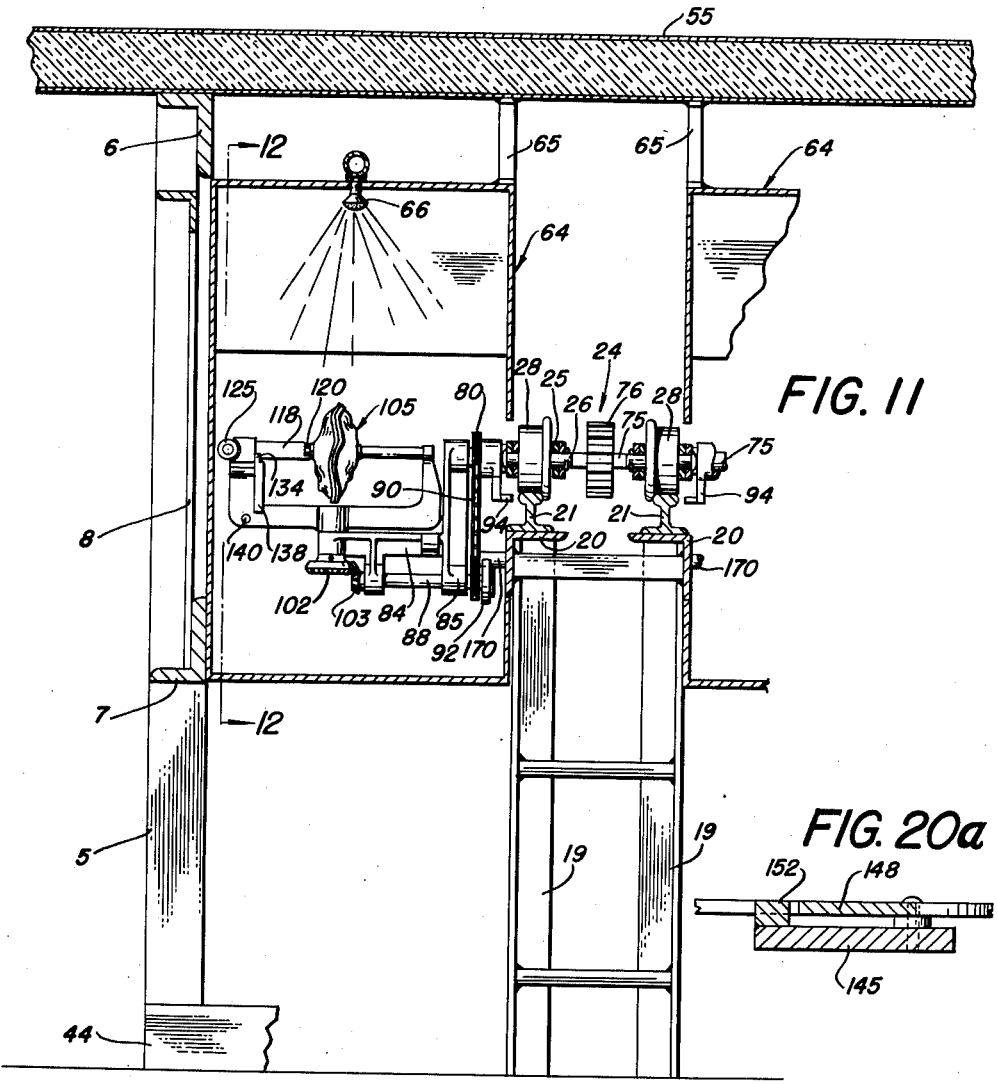

Fig. 11 is a section taken at the cooling chamber on the line 11—11 of Fig. 1.

Fig. 12 is a side view on the line 12—12 of Fig. 11.

Fig. 13 is a detail showing the operation of the device for insuring that the mold carriers are in correct position as they approach the mold opening device.

Fig. 14 is a side view of that portion of the apparatus where the molds are opened for the removal of the finished product, this being the portion of the apparatus shown in the lower right hand corner of Fig. 1.

Fig. 15 is a detail on the line 15—15 of Fig. 14.

Fig. 16 is a detail of the mold opening cam on the line 16—16 of Fig. 14, and Fig. 17 is a section on the line 17—17 of Fig. 16.

Figure 19:
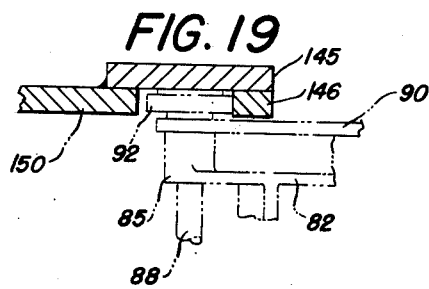
Figure 18:
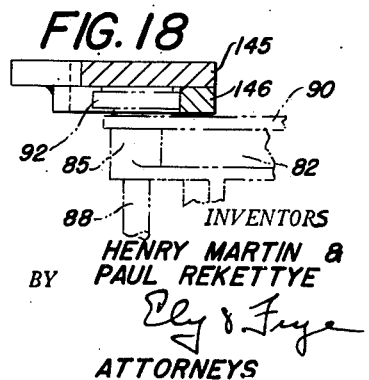

Figs. 18 and 19 are detailed sections on the lines 18—18 and 19—19, respectively, of Fig. 14.

Fig. 20 is in effect a continuation of Fig. 14 and shows the progression of the open molds to the charging and loading station and the closing of the molds.

Figure 20A:
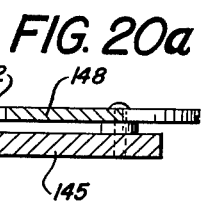

Fig. 20a is a section on the line 20a—20a of Fig. 20.

Figs. 21 and 22 are sections on the lines 21—21 and 22—22 of Fig. 20, respectively, showing details of the device for holding what now becomes the upper half of the mold raised above the lower or stationary half until the charge is injected into the lower half of the mold.

Fig. 23 is a vertical section taken just ahead of the charging mechanism, the location of the view being shown by the section line 23—23 on Fig. 20.

Fig. 24 is a detail of the control switch that actuates the charging device, being taken on the line 24—24 of Fig. 20, and Fig. 25 is a section thereof on the line 25—25 of Fig. 24.

Figure 26:
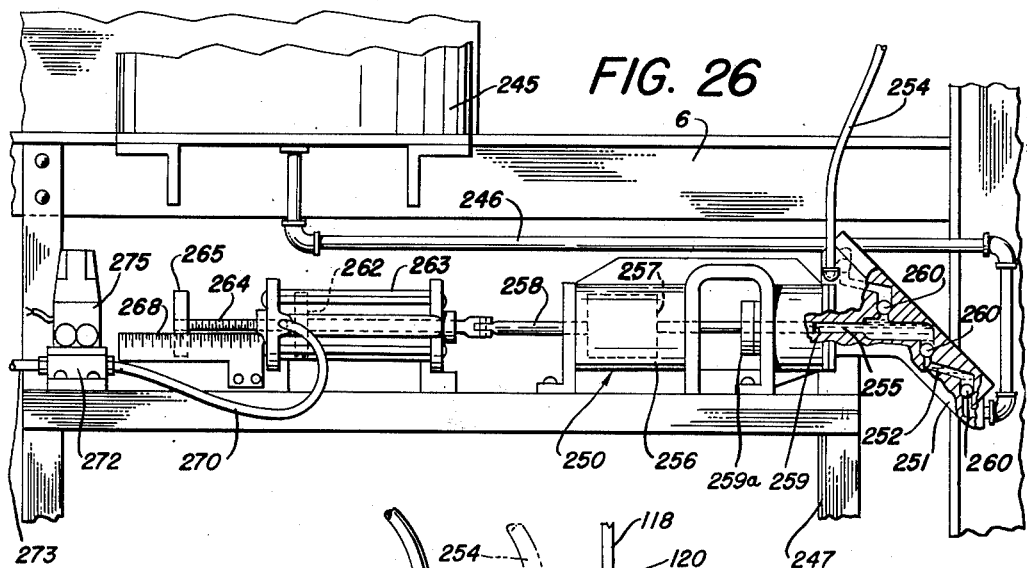

Fig. 26 is an enlarged view of the measuring pump which delivers the accurately measured charge of the casting to each mold as it passes the charging point.

Figure 27:
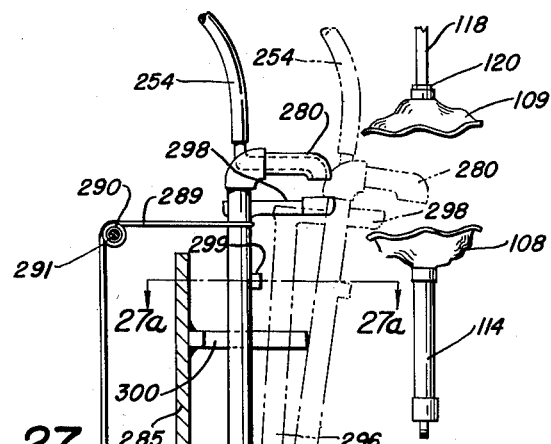

Fig. 27 is a view showing the movement of the charging device, the location of this view being indicated by the line 27—27 on Fig. 28.

Figure 27A:
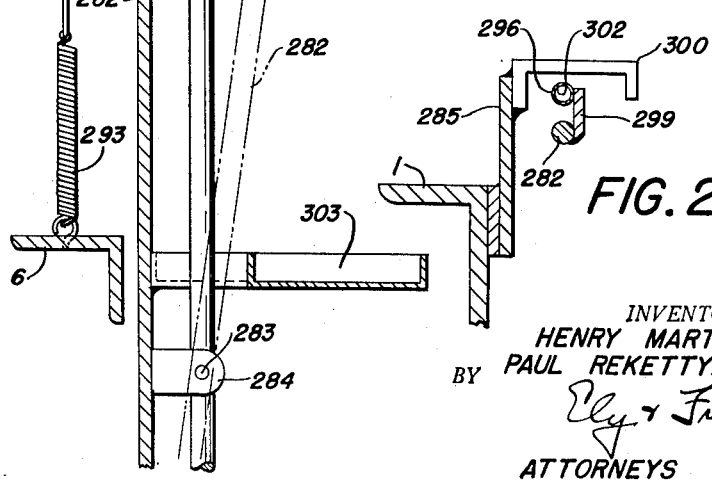

Fig. 27a is a section on the line 27a—27a of Fig. 28.

Fig. 28 is a horizontal section on the line 28—28 of Fig. 20 looking down on that portion of the apparatus where the charge is delivered, and the mold closed and locked.

Fig. 28a is a fragmentary view showing the position of a matrix carrier just before it reaches the point where it starts in rotation.

Figure 29:
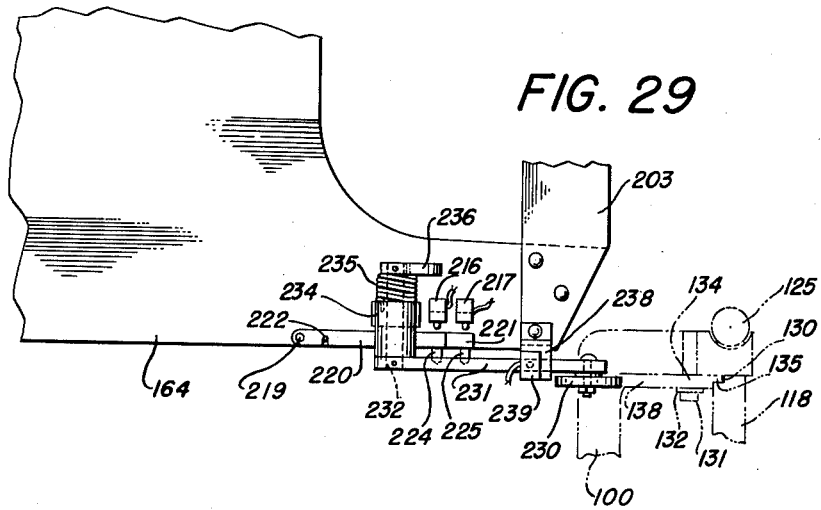
Figure 30:
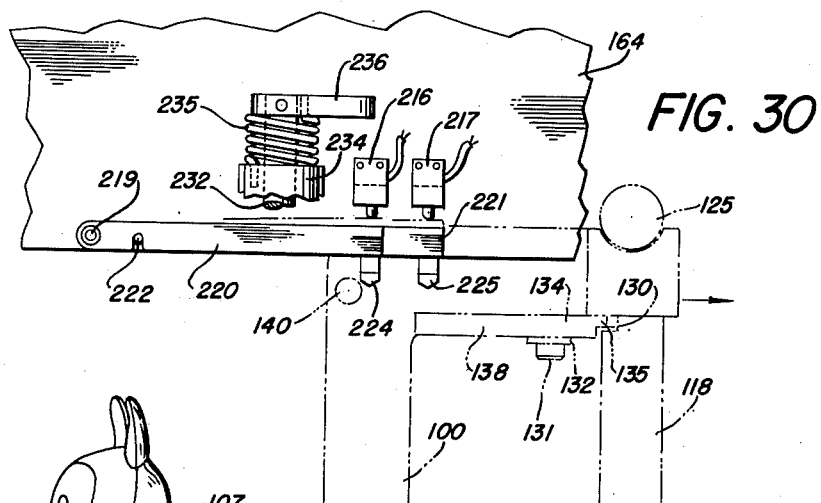

Fig. 29 is a detail of the mold locking device, and Fig. 30 is a somewhat enlarged view thereof in another position.

Fig. 31 is a detail of the control for the charging and mold locking devices.

Figure 32:
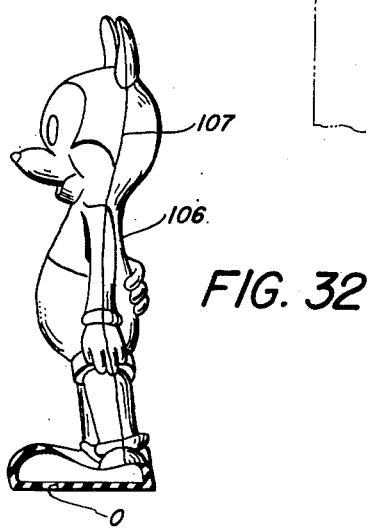

Fig. 32 is a view showing an example of a hollow article which may be cast by the use of the apparatus.

The machine shown and described herein is a duplex machine in which two series of molds or matrices are carried on either side of an endless conveyer chain or belt, thus providing a unit capable of large and economical production. The dual operation is not essential to the invention as a single set of matrices may be used. The dimensions of the fusing oven and the speed of the conveyer may be varied, depending upon the period required for gelling and fusing the articles within the molds.

*General description*

The various operating elements are carried upon a pair of vertical uprights 1 and 2, upper cross beams 3, and lower cross beams 9, located to the right of the machine where the molds are opened, the finished articles removed, and the molds reloaded, and upon a pair of intermediate, shorter uprights 4 and uprights 5 at the left hand end of the machine where the drive mechanism is located. Welded to the uprights are upper and lower channels 6 and 7, which may be suitably braced as shown at 8.

Near the upper part of the machine, at either end thereof, are vertical plates 10 to which are welded the two side plates 11, which extend along the entire machine and to which are bolted the two oppositely positioned angular platforms 15, on which are mounted the rails 16 that support and guide the conveyer chains during the loading of the molds and during their travel through the oven.

In the lower part of the frame and supported upon uprights such as shown at 19 in Fig. 11 are two parallel downwardly inclined angle iron beams 20, to the upper side of which are attached rails 21 which support the conveyer after it makes its return bend and while it passes through the cooling chamber. The inclination of the conveyer during its return movement provides a vertical run of the conveyer during which the finished articles are removed from the matrices.

The conveyer is given the general reference numeral 24. In the particular embodiment shown herein, the conveyer consists of a dual chain, each chain being made up of two sets of pivoted links 25 connected by transverse pins 26. On each pin 26 is a flanged wheel 28 which moves over the rails 16 and 21. The two chains are trained over large sprocket wheels, those at the right hand end of the machine being upper and lower idler sprockets 29 and 30, respectively, which are vertically spaced to afford a substantial vertical flight at the right hand end of the machine so that the articles may be removed, the interior of the molds inspected, and any residue removed therefrom before the molds pass to the loading station. The sprockets 29 are keyed to a transverse shaft 31 and the sprockets 30 to the shaft 32. The shaft 31 is mounted in bearings 34, attached to the uprights 1 and 2, and also in a central bearing 35 secured to the right hand plate 10 (Fig. 23). The lower shaft 32 is supported in end bearings 36, vertically adjustable on the lower part of the uprights 1 and 2, as indicated by the dotted lines in Fig. 20. The vertical adjustment permits any slack in the chain to be taken up.

The conveyer 24 is driven by a pair of sprockets 39 which are keyed to a shaft 40 mounted in the left hand uprights 5 and in a bearing carried by the left hand plate 10 in the same manner as the shaft 31. The shaft 40 is extended to one side of the machine where it is keyed to a sprocket 41 over which is passed the chain 42, which also engages a sprocket 43 mounted on the transverse drive shaft 45. Shaft 45 is driven through a gear reduction unit 46 and a variable speed drive mechanism 47 of any preferred type which are mounted on a platform 44 at the base of the uprights 5. A motor 48, mounted on an extension 49 from the platform 44, drives the power transmission assembly through the belt 50.

The speed at which the conveyer is propelled through the machine will depend upon a number of factors, among which are the size of the matrix cavity, the character and properties of the casting material which is being used, some of such materials setting up and fusing at shorter intervals than others. The temperature of the fusing oven and the heat conductivity of the matrices will also affect the time interval. All of these factors are determined and the speed of the conveyer adjusted thereto so that the casting material will be properly fused by the time the matrices pass out of the fusing oven.

The fusing oven is a long tunnel or chamber 55 which encloses the upper horizontal run of the conveyer 24. It extends from a point spaced sufficiently from the right hand uprights 1 and 2, to allow the matrices to be charged and then closed and locked, to a point near the left hand uprights 5. It may be provided with a hooded extension 56 which surrounds the sprockets 39 and prevents undue heat loss. The walls of the oven are thoroughly insulated, as shown in Fig. 3, and the oven is supported on the longitudinal rails 6. Interiorly of the tunnel are located the curved vertical walls 58 which partially surround the matrices as they are carried through the tunnel. These walls are highly polished so that they will reflect heat rays which are generated by electrical heating units 59 mounted on the walls 58. To prevent heat loss, the heating chamber is divided by the two angular partitions 60, the inner surfaces of which are reflecting so as to radiate heat. The walls 58 and 60 completely surround the matrices as they pass through the tunnel, the partitions being provided with horizontal slots 61 through which the matrix carriers may pass. The partitions and the walls 58 are supported on transverse rails 62 at the base of the oven and by hangers 63 from the ceiling. The temperature within the fusing oven is set to the requirement of the articles being molded and may vary between 300° and 650° F. To control the heat, a heat-sensitive bulb 69 is located in a recess 70 in the wall 60 of each chamber. This bulb is exposed to the radiant heat in the oven and is connected to a control mechanism for the heater located in a box 71 at each side of the oven.

It is necessary to cool the matrices down to a temperature well below the fusing point of the casting material before the matrices are opened. This again depends upon the character of the casting material, but the cooled temperature is usually between 180° and 200° F. For this purpose there is provided a cooling chamber or tunnel which surrounds the conveyer during its return run, while it is supported on the inclined rails 21. The cooling tunnel is indicated as a whole by the numeral 64. In the form shown, an individual tunnel is provided for each side of the conveyer and each is carried by the braces 8, the rails 20, and hangers 65 from the underside of the heating oven 55. Located in the ceiling of the tunnel 64 are a plurality of cooling water sprays 66, which discharge over the matrices, the water flowing out of the cooling tunnel and being collected in a trough 68.

The matrices and carriers

Between every other pair of supporting wheels 28 on each side of the conveyer and welded to the opposite links 25 in a chain is a bearing sleeve 72, and in each pair of sleeves on the opposed chains is rotatably mounted a shaft 75. Keyed to the center of each shaft 75 is a pinion 76. During the travel of the chain, from the time the matrices are closed and locked until the conveyer passes out of the fusing oven, the shaft 75 is rotated by the engagement of the pinion 76 with a long, stationary rack 78 mounted at the center line of the platforms 15. This arrangement serves to impart a compound rotation to the matrices in the manner to be described, so that the charge of casting material is thoroughly and equally distributed over the inner surfaces of each matrix.

Where each shaft 75 projects beyond the chain 25 is located a bushing 79 on which is rotatably mounted the hub on a sprocket 80. On the extreme end of each shaft is fixed a crank arm 82, the outer end of which is formed with a side arm or crank 84. On the outer end of the crank arm are provided the two extended aligned bearings 85 and 86, in which is mounted the shaft 88. The inner end of the shaft 88, or that end adjacent the conveyer chain is fastened to a sprocket 89, and a sprocket chain 90 connects the two sprockets 80 and 89. On the extreme inner end of the shaft and held in place by a disc 93 (Fig. 7), is journaled a roller 92, which, at certain times during the travel of the conveyer, serves to hold the crank arm 82 from rotating about the axis provided by the shaft 75. Projecting inwardly from each sprocket 80 is a angular pin 94, the outer end of which is the plane of the conveyer chain and will strike the chain as the sprocket tends to rotate with the shaft 75. One of the functions of this pin is to hold the sprocket 80 stationary so that as the arm 82 moves about the axis 75, the chain 90 will drive the shaft 88. In this manner, rotary motion is imparted to the shaft 88 while the arms 82 rotate in a vertical plane as they are driven by the pinion 76 and rack 78. The pin 94 also functions at times to bring the matrix carriers to a definite angular relation with respect to the plane of the conveyer. Near the bend in the crank arm is fixed a cam shoe 96, which at times in the operation of the conveyer rides along certain guiding surfaces, to be described, to hold the crank arm in its required position.

In the extreme outer end of the crank 84 is a bearing 98 which is radial to the shaft 75, and in this bearing is received a short shaft 99, the inner end of which carries the yoke 100 which is the immediate matrix carrier. On the outer end of shaft 99 is a bevel pinion 102 which meshes with a bevel pinion 103 on the outer end of shaft 88. It has been found that by making the sprockets which drive the matrices of sizes so that the number of teeth on one sprocket is not the same or an equal division of the number of teeth on the other sprocket, the casting material within the matrix is evenly distributed over the inner surface. Were the number of teeth on the two sprockets 80 and 89 the same or equal multiples of the number of teeth on the other, the casting material would tend to flow in regular zones or paths over the interior of the matrix, rather than to distribute evenly over the entire surface thereof. In actual practice, the sprocket 89 has been provided with 19 teeth and the sprocket 80 with 42 teeth, but this ratio is not important as many unequal ratios will be found to accomplish the purpose.

Midway between the parallel arms of the yoke 100 is located the matrix which is given the general reference numeral 105. Many different forms of matrices may be installed in the machine, it being desirable, however, that any series of matrices on one side of the conveyor shall require equal amounts of the casting material because the matrices are automatically charged with measured amounts of the material to form the shell on the interior of the matrix. The machine is peculiarly adapted to form articles of all sorts of irregular contours with even wall thickness throughout. In the particular form shown here, the matrix is cut to form the toy doll indicated at 106 in Fig. 32. Even more complicated designs are correctly followed in the operation of the machine. It is also desirable to have the matrices interchangeable so that all sorts of articles may be produced in the machine simply by changing the matrices. The matrices are usually made of metal to provide for heat transfer to and from the interior of the matrix, being preferably made of copper or steel, copper or bronze plated on its inner surfaces and exteriorly coated with a dark, heat-absorbing coating.

Each matrix, of whatever form employed, is made in two sections, divided along a line which will preferably follow the contour of the article at its widest parts. For example, on the toy selected for illustration, the dividing line between the two matrix sections is indicated by the line 107 in Fig. 32. This will make a fairly equal division between the areas in each matrix and will give a generally cup-shaped or concave contour to each matrix half.

In the embodiment of the invention shown herein, the matrix is divided into the two sections 108 and 109, the former being designated as the lower section because it is the one which receives the charge of casting material. The section 108 is stationary on the yoke 100. The upper and movable mold section 109 is the one which is shifted to open the matrix at the end of the operation and remains in raised position until after the charge is received in the lower section, whereupon it is closed and locked before the matrix supporting unit starts to revolve.

In order to provide for interchangeability of matrices, the lower or stationary matrix section 108 is provided at its center with a threaded socket 111, in which is received the threaded stud 112, which is in turn threaded into a post or spindle 114, the lower end of which is seated in one of the arms of the yoke 100 (see Fig. 8). A set screw 115 is threaded through the yoke arm and holds the post in position. By providing a removable post such as 114 between the lower matrix section and the arm, deeper or shallower matrix sections may be employed, the overall depth of the complete matrix being compensated for by changing the posts 114 to suit. This will also bring the lower matrix sections to the correct level to receive the charge of casting material. The set screw 115 also permits the lower matrix section to be twisted upon the central axis to insure accurate registry of the lower matrix section with the upper matrix section.

The upper or movable matrix section 109 is mounted on the lower end of a sliding bar 118 in a somewhat different fashion. In this case a stud 119 is threaded into the top of the section 109 and in the lower end of the bar 118, and an adjusting nut 120 is interposed between the matrix section and the bar. This enables the operator who is setting the matrices in the yokes 100 to make a final adjustment to insure that the two matrix sections come into tight sealing relation when the bar is brought down to close the matrix and is locked in place, as will be described. This adjustment is done by threading the stud 119 into either the section 109 or the bar 118 to the required distance and then turning the nut 120 to lock the stud in its adjusted position.

The slide bar 118 is rectangular in cross section and at its outer end is slidably mounted in a guideway 122 formed in an enlargement in the arm of the yoke opposite the point of attachment of the lower matrix section. On the outer end of bar 118 is a bearing pin 124 on the ends of which are mounted the rollers 125 by which the bar is shifted to open the matrix and by which the movable matrix section is held in raised position at the time the charge is introduced into the lower matrix section. In the lowered or innermost position, the rollers 125 seat in recesses 126 found in the yoke 100. The rollers 125 also receive the blow of a hammer, which brings the two matrix sections into tight fitting relation before the matrix passes to the point where it is set in rotation by the gear 76 and rack 78.

It is essential to provide means for locking the two matrix sections in closed position. For this purpose, the edge of the bar 118 adjacent the yoke 100 is provided with a notch 130 and on the inside of the arm of the yoke is threaded a pivot pin 131 around the outer end of which is located a bearing collar 132. On the collar and held by the bolt is a rocking, locking lever 134. One side of the lever 134 is formed with a cammed locking surface 135, which enters the notch 130 and securely locks the two matrix sections together. From the other side of the lever 134 extend the two diverging arms 137 and 138 which pass to opposite sides of the yoke 100, as seen in Fig. 10.

After the movable matrix section is brought down by the hammer referred to, appropriate mechanism strikes the arm 138 and moves the cammed surface 135 into the notch. The lever 134 remains in this position until the matrix passes out of the cooling tunnel 64 and is ready to be opened, whereupon mechanism to be described strikes the arm 137 which frees the lock so that when the matrix reaches the opening point in the travel of the conveyer the bar 118 is shifted outwardly to open the matrix. This is the operation which is shown in Figs. 14, 16 and other views, at which time it will be noted that the yoke 100 is so positioned that the matrix section 109 is then beneath the section 108. It will also be noted that the position of the arms 137 and 138 is reversed from the position shown in Fig. 10 because the yoke 100 is reversed in those figures.

On the yoke 100 is located a pin 140 which operates the switches that in turn actuate the mechanism for delivering the charge of casting material to the stationary matrix section.

*Matrix opening and closing*

Starting at the point in the continuous cycle of the conveyer when the matrix is open and the operator removes the finished article, the various mechanisms which open and close the mold at the proper time in the cycle will now be described. For this purpose the description will start with the condition of a matrix and the position of the yoke 100 at the lower right hand corner of the machine as viewed in Fig. 1 and as shown in greater detail in Fig. 14.

At the point selected, the matrix section 109 has been removed from the stationary matrix 108 so that the bar 118 is at its outer position.

The yoke 100 is hanging by gravity in about the position shown at A in Fig. 14. The pinion 76 is idle so that the whole yoke assembly is free to turn about the shaft 75. The finished article usually lies in the section 109 ready to be removed by the operator and the matrix is about to start on its upward travel toward the loading point.

In order to hold the yoke in a fixed position during its upward travel, so the operator may remove the article and inspect the mold, and clean it, if necessary, a cam track is arranged at the right hand side of the machine, into which the roller 92 enters and by which the yoke is held in the position shown to the right of Fig. 14. The cam track, which is duplicated on both sides of the machine, is composed of a long plate 145 to which is welded a rail 146, the plate and the rail being turned at the lower end toward the oncoming matrices, so that the rollers 92 will successively enter the cam track and be guided thereby in their upward travel. The plate 145 is welded at its upper end to a semi-circular plate 148, which is bolted to a sleeve 149 loosely surrounding the shaft 31 and held in position by a collar 147. The lower end of plate 145 is welded to a plate 150 mounted in the same manner on the shaft 32. A supplemental back rail 152 is welded to the plate 145 between the plates 148 and 150 to complete the cam track. Near the upper end of plate 145 the rail 146 flares outwardly, as shown at 154 in Fig. 20, spaced from and paralleling the arc of the plate 148. As the matrix carriers approach the top of the vertical run of the conveyer, the roller 92 strikes the edge of the plate 148 which now becomes the guiding cam. This serves to turn the yokes as shown in Fig. 20 so that they assume the upright position as they pass into the upper horizontal flight of the conveyer with the stationary matrix sections 108 beneath and the movable matrix sections 109 above. The yokes are also positioned so that the crank arms extend to the rear with the rollers 92 trailing. As the rollers 92 reach the top of the plate 148, they pass on to a supplemental horizontal track section 156, which is welded to a tangent extension 157 of the plate 148. The track section 156 holds the yokes in their upright positions during the loading and matrix closing operations. After these operations are completed, the rollers 92 pass off the rail 156 and the matrix holders are ready to start revolving, which takes place when the pinions 76 engage the rack 78. As explained above, the yokes 100 do not start their independent revolutions until the pin 94 is brought into contact with the adjacent link of the chain. The right hand end of the rack 78 is spaced from the terminus of the rail 156 a sufficient distance to permit the roller 92 to pass off the end of the rail as shown in Fig. 28.

As the yokes turn from what may be termed the inverted position in which they are during the opening of the matrices to what may be termed their upright position during the loading operations, means are provided to hold the movable matrix sections 109 in raised position above the stationary matrix sections 108. This is done by engaging and holding the rollers 125 at the top of the bars 118 in their outward position during this period of the conveyer travel.

As the rollers 92 pass onto the surface of the plate 148, the extended bars 118 pass between two flaring fingers 160 which are extensions of long rails 161 which parallel but are spaced outwardly from the guiding surface formed by the edge of the plate 148 and the tangential rail extension 156. As the fingers 160 converge, the bars 118 are centered and held by the rails 161 while the rollers 125 ride on the top of the rails and thus the matrix sections 109 are maintained in raised position until after the charging operation, whereupon the rollers 125 leave the ends of the rails 161 shown in dotted lines in Fig. 20 and the upper matrix sections drop onto the lower matrix sections.

The rails 161 on each side of the conveyer are secured by bolts 162 to the opposing faces of two parallel vertical supporting plates 164, the shape of which is shown in Fig. 20, it being sufficient to say that the plates 164 are provided with long arc shaped portions which are concentric with the surface of the plate 148 and with a tangent extension which parallels the rail 156. The plates are held in spaced relation to one another by spacer blocks 166 and transverse bolts 167 located at sufficient intervals to form a rigid structure. Each plate 164 has a vertical extension which is riveted to an angle iron 169, the irons 169 being welded to the underside of the cross beams 3.

As the matrix carriers pass out of the oven 55 and around the sprockets 39, they are free of any guiding or turning devices and hang by gravity, due to the weight of the crank arm and the elements carried thereby in the position shown at the left in Fig. 12. The yokes, however, may be in non-uniform, angular relation with respect to the plane of the conveyer. In order to straighten up the matrix carriers so that all of the yokes 100 will stand outwardly at right angles to the vertical plane of the conveyer, in position for the succeeding operations, a pin 170 is located on a beam 26 in position so that it will be struck by the crank arm 82 as it reaches the pin. (See Figs. 12 and 13). The forward movement of the conveyer will rock the matrix carrier as shown in Fig. 13 and, at the point where the sprocket 80 is arrested in its rotation by the contact of the pin 94, which is now beneath the chain, with the underside of the chain, this will serve to rotate the shaft 88 to the correct amount to turn the yoke to the right angular position shown to the right in Fig. 12 and in Fig. 13. As the crank arm passes off the pin 170, the carrier will fall by gravity to its vertical position but the yoke will not turn upon its axis 99 because the pin 94 now moves idly away from the chain to the position shown in Fig. 11. This simple expedient operates to correctly position the yokes, no matter what position they assume, because the pin 170 is so located that when the matrix carrier is in the angular position forced upon it by the pin 170, the yoke is parallel to the crank portion 84 of the crank arm.

It is also desirable to have the yokes 100 at the same angular relation with respect to the conveyor at the time that the pinions 76 engage the rack 78 and, for this purpose, the pin 94 is employed, reference being made to Figs. 20, 23, 28 and 28a. On each side of the conveyer, there is secured to the underside of the cross beams 3 pairs of angular brackets 174 in which is secured an arm 175 which extends forwardly toward the oven 55, then downwardly to a point near the conveyer, where it terminates in a cam surface 176. This cam surface is located so that it will be struck by the pin 94 just before the roller 92 reaches the end of the track 156. As the matrix carrier is held at this time against rotation about the axis 75 by the contact of the roller 92 with track 156, the movement of the sprocket 80 caused by contact of pin 94 with the cam surface 176 will cause the shaft 88 to rotate to the required degree to correct any misalignment of the yokes 100.

Rotation of the matrices at this point also causes a preliminary distribution of the casting material over the interior of each matrix before the commencement of rotation by the rack 78. It sometimes happens that the casting material will start to set immediately after it is introduced into a matrix and this preliminary rotation will prevent the formation of a heavy area in the article due to premature setting.

It is desirable to cool the molds only to a point below the fusing point of the casting material which conserves heat units in the gelling and fusing periods, and thus speeds up production. As noted above, molds are not brought back to room temperature before they are opened, and the fact that the matrices are still at an elevated temperature when they reach the point where the charge of casting material is introduced therein might cause a premature localized gelling of the material if the matrices remained stationary for any appreciable time. The machine prevents this occurrence because the rotation of the matrices is initiated immediately after the matrices are closed, and hence no thick spots will occur such as might be generated by permitting the casting material to remain too long in contact with any one spot of a hot matrix.

Returning now to the mechanism for opening the matrices, reference is made to Fig. 14 and the associated detailed views. As the matrices leave the cooling chamber and approach the opening point, they are hanging from the conveyor chain with the yokes 100 at right angles to the plane of the conveyer and, at this time, the matrix locking lever 134 is in the position shown in full lines in Fig. 10, with the cam surface 135 in the notch 130 and the arm 137 projecting outwardly as shown at the left in Fig. 16.

As the matrices approach the lower right hand corner of the machine, the supporting wheels 28 leave the rail 21 and pass on to the upper edge of a horizontal guide track 180 welded to the top of the rail 21. This track 180 supports the chain so that the matrices pass above the matrix opening devices.

It will be noted that as the conveyer chain approaches the matrix opening mechanism, the yokes 100 are standing outwardly at right angles to the plane of the conveyer. For the opening operation the yokes are turned so that they are parallel to the plane of the chain. The first operation is to turn the yokes to the position stated and, for this purpose, there is attached to the beam 29 a triangular plate 182 (Figs. 14 and 15) which is in the path of the roller 92. As the roller on each matrix carrier strikes the rear, upwardly inclined edge of the plate 182, the forward movement of the conveyer causes the entire matrix carrier to swing backwardly or in the clockwise direction as shown at the left in Fig. 14, in much the same manner that the carrier is rocked by the pin 170. In the same manner, the contact of the pin 94 with the underside of the conveyer chain causes the yoke turning mechanism to function and turn the yokes 100 to the position shown in the remainder of Fig. 14, with the yokes presented edgewise to the opening mechanism and with the side of the yokes having the bars 118 at the lower side of the yokes.

When the yokes have been turned in the manner described they pass off the plate 182 and onto a long cam track 185, the upper edge of which is located in the path of the cam shoes 96. This cam track extends from the plate 182 to a point beneath the sprocket 30. It is secured to the floor by bolts 184 and, at its outer end, extends over the top of the cross beam 9. The contour of the cam track is shown in Fig. 14. It starts with an upwardly inclined surface 186 and then passes into a long concave surface 187. As the cam shoe 96 rides over these surfaces, the matrix carrier is rocked about the axis 75 in the various positions shown, which are best adapted for the operations to be performed at this point. The cam track also holds the matrix carrier against movement while the opening operations are being performed and, at its extreme outer end, it serves to support the chain after it leaves the track 180 and starts the chain in engagement with the sprocket 30.

Secured to the cross beam 9 by angle irons 189 are two parallel upstanding plates 190 and 191. These two plates 190 and 191 extend rearwardly to points beyond the lowermost point in the arc 187. At their rear ends they are provided with flared extensions 193 and 194, respectively, which serve to receive and guide the yokes into the narrow channel 192 provided by the main bodies of the plates. It will be noted that the rear end or flared portion of the plate 190 is raised as shown in Fig. 14 and is then cut down to the height of the main body of the plate as shown at 195, this being for the purpose of clearing the locking lever so that it may move to the matrix opening position shown in dotted lines in Fig. 10 and in Fig. 16, where the arm 138 overlies the upper edge of the plate.

The rear portion of the plate 191 is also raised so that it is in the path of the arm 137 of the matrix locking lever and, as the matrix carriers advance into the narrow channel 192 formed by the main portions of the plates 190 and 191, the locking lever will be moved to unlock the molds. The upper edge of the plate 191 is then brought down to the level of the main body of the plate 190 so that during the travel of the matrix carrier through the channel 192 only the extreme lower edge of each yoke is in the channel, as shown in Fig. 17.

After the locking lever 134 has been moved to free the locking cam 135 from the notch 130 in bar 118, the matrix is ready to be opened by drawing the bar 118 downwardly. This operation is performed by two cams 198 which are fastened to the inside top surfaces of the plates 190 and 191 by rivets 199. The spacing of the cams is such that the lower edges of the yoke and the bar 118 will pass between them but the outstanding rollers 125 will strike the curved underside of the cams and the bar 118 will be drawn downwardly in the yoke arm, opening the matrix and exposing the finished article.

The movable upper section 109 of the matrix remains in its outer spaced position above the stationary section of the matrix until after the charge of casting material is delivered to the stationary section and then it drops on the lower section by passing off the rails 161. The contact, however, between the edges of the matrix sections should be tighter than it is possible to obtain by the mere dropping of the upper section 109 and to give adequate sealing there is provided a hammer which strikes the upper end of each bar 118 and drives section 109 against the section 108 with enough force to insure a tight seal around the parting line of the matrix.

The hammer consists of a block 200, the underside of which is formed with a V-shaped recess 201 which strikes against the rollers 125. The hammer is movable in two vertical guide plates 203 attached to the extreme inner ends of the plates 164. The hammer is carried on the lower end of a piston rod 205, the piston of which operates in a cylinder 206 pivoted at 208 to a bracket 207 secured to and extending from the upper cross beams 3. The hammer is further guided in its movement by a rod 209 threaded in an extension 210 at the side of the hammer and received in an aperture in a guide plate 212 secured to the lower end of the cylinder 206. A collar 213 on rod 209 forms a stop for the downward movement of the hammer. The cylinder 206 is air actuated to lower the hammer at the instant that roller 125 on any of the matrix carriers is brought in line with the hammer and is raised immediately thereafter. The movement of the piston in the cylinder is controlled by a standard form of reversing valve, indicated at 215 in Fig. 31. The valve is in turn controlled by two micro-switches 216 and 217, the former actuating the valve 215 to lower the hammer and the latter actuating the valve to raise the hammer. To the side of the plate 164 and pivoted on a pin 219 set therein are two parallel arms 220 and 221, which are in alignment with the switches 216 and 217, respectively, the outer end of each arm terminating just below the switch which it is to operate. Both arms may move upwardly freely but are limited in their downward movement by a stop pin 222 set in the plate 164 and engaging notch in the underside of the arms.

The free end of arm 220 has a downwardly depending lug 224 and the arm 221 a similar depending lug 225, it being noted that the lugs are separated by a space which is sufficient to let the hammer 200 drop on the rollers 125 and then return. The lugs 224 and 225 are located in the path of the pins 140 on the yokes 100.

The V-shaped notch 201 permits the hammer 200 to center itself with respect to the rollers 125 and the pivotal movement of the hammer assembly about the point 208 permits the hammer to move forwardly with each matrix and, after the hammer is raised, to return to vertical position for the next matrix.

It will be seen, therefore, that as the matrix holders advance after receiving the charge, the pin 140 first strikes the lug 224, which actuates switch 216, lowering the hammer with a sharp blow which seals the parting line of the matrix, and then it strikes the lug 225 which actuates switch 217 and the hammer is raised and held in raised position until pin 140 on the next matrix carrier reaches the lug 224.

The locking lever 134 is moved from its unlocked position to locked position after the hammer has delivered its blow. When the matrix is open, the arm 138 projects outwardly of the yoke 100 in the dotted line position of Fig. 10 and this arm must now be moved inwardly to the full line position of Fig. 10. In Fig. 28, the arm 138 is shown projecting outwardly as it approaches the device by which the arm is moved inwardly.

The device for moving the lever into locking position consists of a roller 230 rotatable on a vertical axis on the end of a swinging arm 231. The position of this roller is such that as the matrix carriers advance it swings the locking lever 134 into locking position. The other end of arm 231 is secured to a vertical pin 232 which is rotatably mounted in a bearing 234 secured to the plate 164.

A stout coil spring 235, the tension of which may be adjusted, is wrapped about the pin 232 where it projects above the bearing, one end of the spring being anchored in the bearing and the other being connected to an arm 236 attached to the upper end of pin 232. The outer end of the arm 236 bears against the side of plate 164. The spring 235 presses the roller 230 toward the oncoming matrix carriers, the inward movement of the arm 231 being arrested by contact with the plate 164, as shown in Fig. 28. As the roller 230 rides over the locking lever the arm 231 will yield, as shown in dotted line, but the force exerted by the roller is sufficient to drive the cam surface 135 into tight engagement with the notch 130 on bar 118, securely locking the matrix sections in the tight relationship assured by the hammer blow delivered to it. The relation of the parts is such that the roller 230 is riding on the lever during the operation of the hammer so that the spring pressure on the roller will follow up the action of the hammer and the cam surface 135 will be driven home as the blow is delivered on the rod 118.

If, for any reason, the notch 130 does not register with the cam surface 135, so that the lever arm does not operate to lock the mold under the action of the roller 230, the conveyer should be arrested to permit the mold to be closed and locked by hand. To provide for this safety measure, a bracket 238 is attached to the lower end of one of the guide plates 203 and extends out over the arm 231. In the outer end of the bracket is located the safety micro-switch 239. If the locking lever is not moved to its locking position by the roller 230, the lever will move the arm 231 outwardly until it strikes the safety switch which actuates a circuit breaker (not shown) to the motor 48 and the conveyor stops.

*The matrix charging mechanism*

The casting material is stored in a tank 245, from which the material is led, by conduit 246, to a pump for delivering a measured charge of the material to each matrix as it passes the charging station. Pumps for delivering accurately measured charges of fluid are well known and there are several commercial pumps available. The pump which has been selected for use with the machine is indicated generally by the numeral 250 and is carried by a frame 247 located between and supported by the channels 6 and 7. So much of the pump as is necessary to complete the description of the machine is shown in Fig. 26 and also in Fig. 31.

The casting material from the tank enters at the underside of a head 251, which is provided with a circuitous or stepped passage 252, the upper end of which communicates with an outlet pipe 254 that leads to the charging device. At a central point the passage 252 connects with a passage 255 in which reciprocates a forcing plunger 259 extending through a packing 259a and carried by a piston 257 located in a cylinder 256. Located in the passage 252, on either side of the passage 255, are the ball valves 260 which permit the material to enter and leave the pump but prevent return flow in either direction.

The amount of casting material which is discharged into the line 254 at each forward stroke of the piston depends upon the amplitude of piston movement and this is in turn controlled by adjusting the stroke of a second piston 262 located in an air cylinder 263 and connected to a piston rod 258 for the piston 257. The stroke of the piston 262 is controlled by the adjustment of the stop collar 265 on the rod 264 of piston 262. A scale 268 is located at the side of the air cylinder to enable the operator to set the stroke of the pump accurately for the amount of charge which each matrix will contain.

The air cylinder 263 is connected by a line 270 to a standard type of valve 272 which is operated by the approach of the several matrices to the loading point to admit or exhaust air to the cylinder 263. The air supply line is indicated at 273. The valve 272 is opened at the proper time by a solenoid 275 which is energized by the several matrix carriers as they reach the loading point, as will be described.

The pipe 254 delivers the casting material into a discharge nozzle 280 which is mounted on the upper end of a rod 282, which is pivoted at 283 in a bracket 284 attached to a vertical plate 285 mounted on the inside of the left hand vertical upright 1 (Fig. 23), at a point just before the upper matrix section passes off the end of the rails 161. The lower end of the rod 282 is pivoted to an armature 286 located in a solenoid 288, also mounted on the plate 285. Near the upper end of rod 282 is attached a cable 289, trained over a pulley 290 carried on the end of pin 291, fixed in the upright 1, the cable being connected at its lower end to a spring 293 anchored to the channel 6 (Fig. 27). When the solenoid 288 is energized, the armature is drawn inwardly to the limit fixed by the head 289 of the armature. This operation rocks the rod 282 forwardly to the position shown in dotted lines in Fig. 27 where the nozzle 280 has moved over the lower matrix section 108, which is exposed to receive the charge. As the nozzle reaches a position over the matrix section, the pump is actuated through the air cylinder, as has been described, to eject the measured charge of casting material into the matrix. These two operations are controlled by the position of the matrix holder, as will be set forth.

Also pivoted at 283, directly behind the rod 282, as seen in Fig. 27, is a second vertical rod 296, to the upper end of which is secured a drip cup 298, which is generally L-shaped as shown in Fig. 28, having an arm which projects out beneath the discharge end of the nozzle 280 when the rod 282 is upright. This rod 296 is overbalanced by the weight of the drip cup but forward movement thereof is restrained by a lug 299 attached to rod 282. As the nozzle moves toward the matrix, the drip cup follows the nozzle on its outward movement but movement of the drip cup is arrested just after it passes over the edge of the matrix as shown in Fig. 27 by contact with the outer end of an L-shaped bracket 300 attached to the plate 285. The drip cup thus collects any drops of casting material which falls from the nozzle and the drippings are collected and discharged through an opening 302 and fall into a large pan 303 attached to the plate 285. The pan also receives any drippings which may not be intercepted by the drip cup.

When the solenoid 288 is energized the armature rocks the rod 282 to bring the nozzle 280 over the open lower matrix section, the drip cup following the nozzle until it is arrested by the bracket 300. During the slight dwell over the matrix, the measured charge of casting material is delivered. The solenoid 288 is then de-energized and the spring 293 returns the nozzle to its former position, the lug 299 picking up the drip cup on the return movement.

Pivotally mounted in a bearing 305 on one of the plates 164 at each side of the machine, is a lever 306, the outer end of which is angularly arranged so as to project below the lower edge of the plate into the path of the yoke 100. The outer end of lever 306 is urged toward the path of the yokes by a leaf spring 308 carried on the plate 164. Attached to the plate 164 are two brackets 309 and 310 and on these brackets respectively are located micro-switches 311 and 312 adapted to be closed as the arm 306 is moved outwardly when contacted by each yoke 100. It will be noted that the arrangement of the switches is such that the switch 311 is actuated just a moment before the switch 312 is actuated. As shown in Fig. 31, the switch 311 controls the solenoid 275 which operates the air pump and the switch 312 controls the solenoid 288 which operates the nozzle. As a result, the pump is operated at a sufficient interval ahead of the movement of the nozzle 280 so that a charge of the casting material will be delivered at the moment that the nozzle is over the open lower matrix section.

It sometimes occurs that in the manufacture of articles of intricate design, particularly where the matrix may have sharp undercut areas, that the casting material does not completely fill the recesses of the matrices. For this reason it may be desirable, before admitting the charge of casting material, to give the matrix a preliminary treatment with a suitable agent which will cause the casting material to flow into the most intricate parts of the matrix. It has been found that if the matrix is given a preliminary coating with the plasticizer, which acts in the nature of a wetting agent, the most complicated and intricate patterns will be faithfully reproduced. The machine is provided with means by which this preliminary coating may be applied to the matrices just ahead of the actual charging point.

Located over each run of the conveyer at the point where the conveyer commences its upper horizontal flight is a spray gun 320, which is supported by a bracket 321 from one of the plates 164. As the means for operating the spray guns is the same on either side of the machine, that for operating the gun to the right, as shown in Fig. 23, will be described. The gun is located so that it is directed at the lower matrix section just prior to the charging point. The spray gun is of any of the well known commercial types, the details of which are not shown. It is actuated by a micro-switch 323 mounted on the inside of the inner plate 164. The micro-switch is adapted to be closed by the upward movement of a switch operating arm 324 pivoted to plate 164 at 325. A bracket 326 holds the arm 324 in position to be lifted by the pin 140 on each matrix carrier as it moves toward the charging position. The force of the air gun not only thoroughly coats the lower matrix section which is directly in the path of the gun, but it causes much of the coating material to rebound onto the underside of the upper matrix section.

Located at some convenient point near the machine is a tank 330 (Fig. 31), which contains a supply of the plasticizer or other wetting agent, and leading from the bottom of the tank is a supply line 331, which conducts the liquid to the spray gun. An air-pressure line 332 leads to the top of the tank to maintain the contents under pressure. From the line 332 a branch line extends to an air supply chamber and pressure regulator 333. From the regulator 333 one line 335 extends to an electrically operated valve 336 which is actuated by the micro-switch 323 when the matrix is in alignment with the gun 320. This line 335 is extended to the spray gun, where it serves to withdraw the needle from the mouth of the spray gun, as is standard practice in guns of this type. From the pressure chamber 333 a second line 338 extends to the gun to supply the air blast which sprays the liquid from the gun when the micro-switch 323 is closed.

If the preliminary treatment of the matrix is not required, the entire spraying mechanism may be shut off by closing a valve 340 in the air supply line 332. When in use, however, the preliminary coating of the matrix with the wetting agent will cause the casting material to fill the most intricate patterns in the matrices.

*Operation*

That portion of the complete orbit of the conveyer in which the matrices are rotated may be called the treating zone while the remainder may conveniently be termed the matrix operating zone as it is during this period that the matrices are operated upon to prepare them for the actual setting operation.

Starting with the point where the matrices are open at the right hand side of the machine and with particular reference to Figs. 14 and 20, the matrices are held, by the engagement of rollers 92 with the cam track formed by the rails 146 and 152, in position for convenient removal of the finished articles. As the operator removes each article from the matrix and before the articles chill appreciably, an opening O is punched in the article to vent it. This is necessary for the reason that the articles are still hot when they are removed and unless the article were vented the cooling to room temperature would cause them to collapse as the pressure of the air within the article lowers due to cooling. Instead of punching the article after its removal, a pin such as shown at P in Fig. 8 could be inserted at some convenient point in a matrix section, which would form the vent in the article during the casting operation.

As the matrices approach the top of the vertical run, the rollers 92 strike the edge of plate 148, which turns the matrix holders on their axes 75 and the bars 118 enter the slot between the rails 161, with the roller 125 above the rails, which holds the sections 109 in raised position. The matrices then move to the loading and matrix closing stations. If the additional charge of plasticizer is to be used, the spray gun is operated, as described, before the loading point is reached.

The matrices now reach the loading station, whereupon the lever 306 actuates the switches that move the charging nozzle 280 over the lower matrix section and actuates the pump 250, the charge is delivered, and the nozzle returns. The rollers 125 now pass off the ends of the rails 161 and the matrix section 109 drops into the section 108. The hammer 200 is brought down on the rollers 125 and returned by the two switches 216 and 217 as they are closed successively by the arms 220 and 221. During this time the latch 134 is moved by the roller 230 into the notch 130. The sealed and loaded matrices are now ready for the operation of distributing the casting material over the inner surfaces of the matrices and the subsequent gelling and fusing.

The rollers 92 pass off the end of the track 156 just after the position of the yokes is set by the contact of pin 94 with the cam surface 176 on arm 175. This sets the yokes in proper position and the pinions 76 on shafts 75 now engage the rack 78. As the resistance offered by the rotation of the yokes in their bearings 98 is greater than the resistance to movement about the axis 75, the arms 82 will start in rotation with shafts 75. As the sprocket 80 on each matrix carrier is a part of the yoke rotating mechanism, it will follow the movement of the arm 82 until the pin 94 strikes the upper edge of the adjacent chain link 25. Rotation of the arms 82 will continue and that rotation will set in operation the sprocket chain 90 as it passes around the now stationary sprocket 80. This causes the rotation of shaft 88, which is transmitted to the yoke 100. The combined rotation of the arm 82 and the yoke 100 causes each matrix to revolve in two planes during its progression through the gelling and fusing periods, and it will be noted that the ratio between the sprockets 80 and 89 which rotate the yoke upon its axis, is such that there is no possibility of the casting material following any definable paths as it is flowed over the inner surface of the matrix. Unless this precaution is observed, there is danger of the casting material forming in thick and thin spots instead of the even thickness layer which is desirable.

The rack 78 extends the entire length of the upper run of the conveyer, which now enters the long heated oven 55 in which the material within the matrices first gels in the even layer shown by the dotted lines in Fig. 8 and then fuses. The duration of the gelling and fusing period varies, as explained, and the speed of the conveyer is adjusted accordingly. During the travel through the oven the matrices are in constant rotation about the two axes as explained.

At the far end of the oven, the conveyer starts on its return movement supported by the inclined rails 21. The matrices now enter the cooling chamber 64 where the water sprays reduce their temperature to a point well below the fusing temperature where the articles set and may be handled. In the oven the yokes 100 are brought to uniform position as shown in Figs. 12 and 13.

The matrices continue in this position until the conveyer passes on to the rails 180. The roller 92 on each matrix holder now strikes the plate 182, which turns the yoke so that it is presented edgewise to the opening mechanism preparatory to which the cam shoes 96 meet the cam track 186, which holds the yokes in position so that they enter the slot between the plates 193 and 194, where the first operation is to open the latch 134, followed by the opening of the matrices by the engagement of rollers 125 with the cams 198. The matrices now pass out of the cams to the starting point.

It will thus be seen that an automatic machine has been perfected in which a multiplicity of matrices are carried on a continuously moving conveyer through all of the stages necessary for the internal casting of all sorts of hollow articles. While vinyl chloride polymers or copolymers of vinyl chloride and vinyl acetate are suitable for use in this type of casting machine, other materials which will flow and then gel and fuse on the interior of a hollow mold may be employed. Preferably these materials are of the thermo-setting variety, although this is not an indispensible feature of the invention.

The invention has been described in great detail in order that the various operations, as well as the mechanisms adopted for carrying out those operations, will be explained in such particularity so that the preferred form of the invention will be fully described. However, it is not intended that the scope of the invention shall be in any way restricted to the specific embodiments shown. While many of the operations are desirable in any embodiment of the invention, others may be omitted or modified without materially affecting the carrying out of the basic features of the invention. While the chain type conveyer is preferred, any other conveying means may be substituted therefor.

The machine produces a great volume of hollow articles at a very substantial reduction in cost of operation. In many ways this machine is much superior to the old molding processes. The pressure exerted by the confined body of air in each matrix as it passes through the oven compacts the layer of material.

While the machine is particularly designed for the manufacture of hollow articles from thermosetting plastic materials, it may be modified for use with cold setting materials as well. Appropriate changes in the treating zone will adapt the machine to either type of casting operation.

What is claimed is:

1. A machine for the manufacture of hollow articles comprising a conveyer, a plurality of matrix holders on the conveyer, sectional matrices in the holders, means to hold the sections of each of the matrices in spaced relation in its holder as each matrix approaches a loading point in the travel of the conveyer, a charging device at the loading point, means to move the charging device into and out of register with a matrix section while the sections are separated, means to bring the matrix sections together after the charge is delivered to a matrix section by the charging device and the charging device withdrawn, means operable after the matrices are closed to rotate them to distribute the casting material over the interior of the matrices, a fusing chamber through which the conveyor travels during the rotation of the matrices, and means to separate the matrix sections after they leave the fusing chamber.

2. A machine for the manufacture of hollow articles comprising a conveyer, a plurality of matrix holders on the conveyer, sectional matrices in the holders, means to hold the sections of each of the matrices in spaced relation in its holder as each matrix approaches a loading point in the travel of the conveyer, a charging device at the loading point, means to move the charging device into and out of register with a matrix section while the sections are separated, means to bring the matrix sections together after the charge is delivered to a matrix section by the charging device and the charging device withdrawn, means operable after the matrices are closed to rotate them to distribute the casting material over the interior of the matrices, and means operable after the casting material has set in contact with the inner surface of the matrices to separate the matrix sections.

3. A machine for the manufacture of hollow articles comprising a conveyer, a plurality of matrix holders on the conveyer, a sectional matrix in each holder, means to hold the sections of each matrix apart as each matrix approaches a loading point, a charging device at the loading point, means to move the charging device into and out of register with a matrix section and to release a charge of casting material into the said matrix section while the charging device is in register, means to bring the matrix sections together after the charge is released and after the charging device has withdrawn, means to engage the matrix holders and to rotate them and at the same time to rotate the matrices in the holders, and means to separate the matrix sections while the matrices are on the conveyer after the casting material has been distributed over and set on the interior of the matrices.

4. A machine for the manufacture of hollow articles of a thermo-setting fluid casting material comprising a conveyer, a plurality of matrix holders on the conveyer, a sectional matrix in each holder, means to hold the sections of each matrix apart as each matrix approaches a loading point, a charging device at the loading point, means to move the charging device over a section of each matrix and to deliver a charge of the casting material into said matrix section, means to bring the matrix sections together after the charge is delivered and the charging device withdrawn, means to engage the matrix holders to rotate them and at the same time to rotate the matrices in the holders, a heated tunnel through which the conveyer travels during the rotation of the holders and matrices, and means to separate the matrix sections while the matrices are on the conveyer after the casting material has been distributed over and set on the interior of the matrices.

5. A machine for casting hollow articles in matrices comprising a continuously moving conveyer, a plurality of matrix holders journaled on the conveyer, a section matrix rotatably mounted in each holder, means to hold the sections of the matrices apart as they approach a loading point, a charging device at the loading point, means to bring the charging device between the separated matrix sections and to cause it to deliver a charge of the material to one of the matrix sections and then to withdraw from between the sections, means to close the matrix thereafter, means engaging the matrix holders to rotate them on the conveyer and at the same time to rotate the matrices in their holders, an opening device operable after the material has been distributed and set on the interior of the matrices to separate the matrix sections, and means to prevent rotation of the matrix holders and matrices during the operation of the opening device.

6. A machine for casting hollow articles in matrices comprising a continuously moving conveyer, a plurality of matrix holders journaled on the conveyer, a section matrix rotatably mounted in each holder, a latch on each matrix to lock the sections together, means to hold the sections of the matrices apart as they approach a loading point, a charging device at the loading point, means to bring the charging device between the separated matrix sections and to cause it to deliver a charge of the material to one of the matrix sections and to then withdraw from between the matrix section, means to close and lock the matrix sections thereafter, means engaging the matrix holders to rotate them on the conveyer and at the same time to rotate the matrices in their holders, and an opening device operable after the material has been distributed and set on the interior of the matrices to operate the latch to unlock and separate the matrix sections.

7. A machine for casting hollow articles in matrices comprising a movable support, a plurality of matrix holders on the support, a sectional matrix in each holder, one section of each matrix being movable toward and from the other section, a guide in each holder for the movable matrix section, means operable during a portion of the cycle of the support to engage the matrix holders and rotate them on the support and at the same time to rotate the matrices in the holders, means to arrest the rotation of the holders and the matrices during another portion of the cycle of support, and mechanisms acting upon the movable matrix sections during the second portion of the cycle of the support to open the matrices for removal of the articles therefrom and to close and lock the matrices before the matrices are set in movement by the holder rotating means.

8. A machine for casting hollow articles in matrices comprising a continuously moving conveyer, a plurality of matrix holders on the conveyer, a sectional matrix in each holder, means operable during one portion of the travel of the conveyer to engage and rotate the holders and at the same time to rotate the matrices in their holders, and matrix servicing devices operable during the movement of the conveyer, said devices comprising a matrix opening device, adapted to engage one of the matrix sections and move it out of contact with the other section, and a matrix closing device, said opening and closing devices being located in the other portion of the conveyer travel, a charging nozzle located between said devices, and means actuated as each matrix reaches the nozzle to project the nozzle between the matrix sections and discharge a measured amount of casting material into a matrix.

9. A machine for casting hollow articles comprising a continuously moving conveyer, a plurality of matrix holders journaled on the conveyer, a sectional matrix rotatably mounted in each holder, means extending along a portion of the conveyer to engage and rotate the holders and at the same time to rotate the matrices in the holders, a bar connected to one section of each matrix, a cam rail along another portion of the conveyer to engage each said bar and separate the matrix sections, means to hold the sections apart, a charging spout, means operative while the sections are held apart to project the charging spout between the sections and to release a charge of casting material into one of said matrix sections.

10. A machine for casting hollow articles comprising a continuously moving conveyer, a plurality of matrix holders journaled on the conveyer, a sectional matrix rotatably mounted in each holder, means extending along a portion of the conveyer to engage and rotate the holders and at the same time to rotate the matrices in the holders, a bar connected to one section of each matrix, a cam rail along another portion of the conveyer to engage each said bar and separate the matrix sections, means acting upon the bar to hold the sections apart, a charging spout, means operative while the sections are held apart to project the charging spout between the sections and to release a charge of casting material into one of said matrix sections, and means to thereafter release the bar and close the matrix sections.

11. A machine for casting hollow articles comprising a continuously moving conveyer, a plurality of matrix holders journaled on the conveyer, a sectional matrix rotatably mounted in each holder, means extending along a portion of the conveyer to engage and rotate the holders and at the same time to rotate the matrices in the holders, a bar connected to one section of each matrix, a cam rail along another portion of the conveyer to engage each said bar and separate the matrix sections, means to hold the sections apart, a charging spout, means operative while the sections are held apart to project the charging spout between the sections and to release a charge of casting material into one of said matrix sections, and means to thereafter close the matrix sections, said last named means including a hammer to drive the sections together and a latch to hold the sections in closed relation.

12. In a machine for casting articles in sectional matrices, comprising a conveyer, a plurality of arms journaled on the conveyer, a rotatable matrix on each arm, means to engage the arms and rotate the arms during the travel of the conveyer and at the same time to rotate the matrix on each arm, a bar connected to one section of a matrix, a guideway in the arm for the bar, a lock to hold the bar with the matrix sections in contact, means along the conveyer to engage the bar and move it in the guideway to separate the matrix sections, and means at another point along the conveyer to bring the sections together and to engage the lock and the bar.

13. In a machine for casting articles in sectional matrices, comprising a conveyer, a plurality of arms journaled on the conveyer, a rotatable matrix on each arm, means to engage the arms and rotate the arms during the travel of the conveyer and at the same time to rotate the matrix on each arm, a bar connected to one section of a matrix, said bar being movable in a fixed path on the arm, a lock to hold the bar with the matrix sections in contact, means along the conveyer to disengage the lock, means to separate the matrix sections, means at another point along the conveyer to bring the sections together and to engage the lock and the bar, and means to prevent rotation of the arms and matrices while the means for manipulating the matrix sections and the lock are in operation.

14. In a machine for casting articles in sectional matrices, comprising a conveyer, a plurality of arms journaled on the conveyer, a rotatable matrix on each arm, means to engage the arms and rotate the arms during the travel of the conveyer and at the same time to rotate the matrix on each arm, a bar connected to one section of a matrix, a lock to hold the bar with the matrix sections in contact, means along the conveyer to engage the bar and separate the matrix sections, means at another point along the conveyer to bring the sections together and to engage the lock and the bar, and a charging spout movable between the separated matrix sections to deliver a charge of casting material to the matrix.

15. A machine in accordance with claim 13 in which means to bring the matrix sections together includes a hammer with means to drive the hammer against the bar.

16. In a machine for casting articles within sectional matrices comprising a conveyer, a plurality of arms on the conveyer, a sectional matrix on each arm, means for separating and holding the matrix sections apart during the movement of the conveyer, a movable delivery spout alongside the conveyer, means to insert the spout between the matrix sections and to withdraw it therefrom, means operable while the spout is between the sections to deliver a measured charge of casting material to the matrix, means to close the matrix, and means operable thereafter to rotate the matrices in a plurality of planes to distribute the casting material over the entire inner surfaces of the matrices.

17. In a machine for casting articles within sectional matrices comprising a conveyer, a plurality of arms on the conveyer, a sectional matrix on each arm, means for separating and holding the matrix sections apart during the movement of the conveyer, a movable delivery spout alongside the conveyer, means actuated by the approach of the matrix to the spout to insert the spout between the matrix sections, a second means operable while the spout is between the matrix sections to deliver a measured charge of the casting material to each matrix, means operative during a portion of the travel of the conveyer to rotate the matrices simultaneously in a plurality of planes, and a means operative during the remainder of the travel of the conveyer to prevent rotation of the matrices while the delivery spout is between matrix sections.

18. A machine for casting hollow articles in a matrix, comprising a conveyer, a shaft rotatable on the conveyer, means to drive the shaft during the operation of the conveyer, a crank arm on the shaft, a matrix rotatable on the end of the crank arm, said matrix adapted to hold a charge of liquid casting material, and interengaging driving means of unequal pitch to rotate the matrix to distribute the charge of casting material over the inner surface of the matrix.

19. A machine for casting hollow articles in a sectional matrix comprising a conveyer, a shaft rotatable on the conveyer, means to drive the shaft during movement of the conveyer, a crank arm on the shaft, a matrix holder rotatable in the crank arm, a matrix in the matrix holder, one section of the matrix being movable toward and away from the other, a positive latch on the holder to engage and hold the movable matrix section in contact with the other matrix section, and means in the path of the conveyer to disengage the latch and a second means in the path of the conveyer to engage the latch.

20. A machine for casting hollow articles in a sectional matrix comprising a conveyer, a shaft rotatable on the conveyer, means to drive the shaft during movement of the conveyer, a crank arm on the shaft, a matrix holder rotatable in the crank arm, a matrix in the matrix holder, one section of the matrix being movable toward and away from the other, a latch on the holder to engage and hold the movable matrix section in contact with the other matrix section, means in the path of the conveyer to disengage the latch and a second means in the path of the conveyer to engage the latch, a device located between the two latch operating means to shift the movable matrix sections, and a support to hold the matrix sections in spaced relation.

21. A machine for casting hollow articles in a sectional matrix comprising a conveyer, a shaft rotatable on the conveyer, means to drive the shaft during movement of the conveyer, a crank arm on the shaft, a matrix holder rotatable in the crank arm, a matrix in the matrix holder, one section of the matrix being movable toward and away from the other, a latch on the holder to engage and hold the movable matrix section in contact with the other matrix section, means in the path of the conveyer to first disengage the latch and a second latch operating means to engage the latch, a device located between the two latch operating means to shift the movable matrix sections, a support to hold the matrix sections in spaced relation, and a matrix charging device movable between the matrix sections while they are separated.

22. A machine for casting hollow articles in a sectional matrix comprising a conveyer, a shaft rotatable on the conveyer, means to drive the shaft during movement of the conveyer, a crank arm on the shaft, a matrix holder rotatable in the crank arm, a matrix in the matrix holder, one section of the matrix being movable toward and away from the other, a latch on the holder to engage and hold the movable matrix section in contact with the other matrix section, means in the path of the conveyer to first disengage the latch and a second latch operating means to engage the latch, and a hammer alongside the conveyer to drive the matrix sections together during the engagement of the latch.

23. A machine for casting hollow articles in sectional matrices comprising a conveyer, a plurality of matrix holders journaled on the conveyer, a sectional matrix rotatable in each holder, means operative during a part of the orbit of the conveyer to rotate the holders upon their axes and at the same time to rotate the matrices on their axes, means to restrain the holders and the matrices from rotation during another part of the orbit of the conveyer, and instrumentalities operative during the latter part of the orbit to perform the following operations in sequence, (1) separate the matrix sections, (2) inject a charge of casting material in each matrix, and (3) force the matrix sections into edge-to-edge contact and lock them in that condition.

24. A machine for casting hollow articles in sectional matrices, comprising a conveyer, a plurality of matrix holders journaled on the conveyer, a sectional matrix rotatable in each holder, a latch on each holder to hold the matrix sections together, means operative during a part of the orbit of the conveyer to rotate the holders upon their axes and at the same time to rotate the matrices on their axes, means to restrain the holders and matrices from rotation during another part of the orbit of the conveyer, and instrumentalities operative during the latter part of the orbit to perform the following operations in sequence, (1) disengage the latch, (2) separate the mold sections, (3) inject a charge of casting material in each matrix, (4) force the matrix sections into the tight edge-to-edge contact, and (5) engage the latch on each matrix.

25. In a machine for casting articles within sectional matrices comprising a conveyer, sectional matrices on the conveyer, means for separating the sections of each matrix and holding them apart for a portion of the travel of the conveyer, a delivery spout, means to insert the spout between the open matrix sections and to deliver a charge of casting material to one section of said matrices, and means for coating the inner surface of a matrix section prior to the operation of the delivery spout.

26. In a machine for casting articles within sectional matrices comprising a conveyer, sectional matrices on the conveyer, means for separating the sections of each matrix and holding them apart for a portion of the travel of the conveyer, a delivery spout, means to insert the spout between the open matrix sections and to deliver a charge of casting material to one section of said matrices, a spray gun, and means to actuate the spray gun to apply a preliminary coating to a matrix section prior to the operation of the delivery spout.

27. In a machine for casting articles within sectional matrices comprising a conveyer, sectional matrices on the conveyer, means for separating the sections of each matrix and holding them apart for a portion of the travel of the conveyer, a delivery spout, means to insert the spout between the open matrix sections and to deliver a charge of casting material to one section of said matrices, means for coating the inner surface of a matrix section prior to the operation of the delivery spout, means to close the matrix sections after the operation of the delivery spout, and means to rotate the matrices to distribute the casting material over the inner surface of the matrices.

28. In a machine for casting articles in sectional matrices, a conveyer, a plurality of matrices on the conveyer, means for separating the sections of each matrix during the travel of the conveyer, and means for delivering a charge of casting material to one of said matrix sections while the matrix is open, said delivery means comprising a spout and a drip cup beneath the spout, means for moving the spout and the drip cup in unison toward and from the matrix, said spout passing beyond the drip cup at the outer end of its movement to a position over a matrix section, and means for ejecting a charge of the casting material from the spout while it is over the matrix section.

29. Means for delivering a charge of liquid casting material to a sectional matrix, means to hold the sections of the matrix apart, a spout, a drip cup beneath the spout, means to shift the spout and the drip cup from a position outside of the matrix to a position between the separated matrix sections with the spout advanced beyond the drip cup, a measuring device to deliver a charge of the casting material to the spout, means to operate the measuring device while the spout is over the matrix section, and means to restore the spout to a position over the drip cup and then to return the spout and the drip cup to their first named position.

30. A machine for casting hollow articles in sectional closed matrices, comprising a conveyer, said conveyer being movable through a treating zone and a matrix operating zone, a plurality of matrices on the conveyer, means to rotate the matrices on two axes simultaneously while the conveyer is in the treating zone, means located at the treating zone to set the casting material deposited on the inner wall of the matrices by the rotation of the matrices, means located in the matrix operating zone operable to open the matrices, a charging device, means to project the charging device into the open matrices, means acting while the charging device is in register with an open matrix to deliver to each open matrix a measured charge of casting material sufficient to cover the walls of the matrix, means to withdraw the charging device, and means to close the matrices after the delivery of the charges thereinto and before the matrices enter the treating zone.

31. Apparatus for the manufacture of hollow articles from elastomeric material comprising a movable support, an arm carried by the support, means to rotate the arm about its own axis, a sectional, closed matrix on the arm, one section of a matrix being movable with respect to the other section of the matrix, guiding means on the arm for the movable matrix section, means to rotate the matrix on the arm about an axis angularly disposed with respect to the axis of the arm, a chamber through which the arm is moved, said chamber having heating means to set the material which has been distributed over the entire inner surface of the matrix by the compound rotation thereof, a cooling station through which the arm carrying the matrix is moved to reduce the temperature of the matrix, and means to hold the matrix sections together during the rotation thereof but releasable after pasing the cooling station to permit the mold to be opened for the removal of the finished article and the admission of a new charge of the material to be introduced therein while the matrix is restrained from rotation.

32. Apparatus for the manufacture of hollow articles from elastomeric material comprising a movable support, an arm carried by the support, a sectional, closed matrix on the arm, means to rotate the arm, each matrix comprising a stationary matrix section and a movable matrix section, the arm having a guide by which the movable matrix section is guided to and from sealing contact with the stationary matrix section, about its own axis, means to rotate the matrix about an axis angularly disposed with respect to the axis of rotation of the arm to distribute a charge of the material over the entire inner surface of the matrix, a heating device through which the arm is moved and by which the material is set in contact with the interior of the matrix, a cooling device through which the arm is moved after the material has set, the arm being movable to another station, and means to hold the matrix sections together during the rotation thereof but releasable at the last named station to open the matrix for the removal of the finished article and the placing of a new charge of the material in the matrix, said arm and matrix rotating means being inactive at the last named station.

33. Apparatus for the manufacture of hollow articles from elastomeric material comprising a support movable through a series of stations, an arm carried by the support, a sectional closed matrix on the arm, said matrix sections being separable, means to force the matrix sections in tight edge-to-edge contact, means to rotate the arm about its own axis, means to rotate the matrix about an axis angularly disposed with respect to the axis of rotation of the arm to distribute a charge of the material over the entire inner surface of the matrix, a heating device at one station through which the arm is moved and by which the material is set in contact with the interior of the matrix, a cooling device at another station through which the arm is moved after the material has set, and a further station to which the arm is moved at which the means for holding the matrix sections together is releasable to permit the matrix to be opened for the removal of the finished article and the admission of a new charge of the material, said arm and matrix rotating means being inactive at the last named station.

HENRY MARTIN.
PAUL REKETTYE.

(References on following page)

REFERENCES CITED

The following references are of record in the file of this patent:

UNITED STATES PATENTS

| Number | Name | Date |
|---|---|---|
| 1,328,887 | Nitzgen | Jan. 27, 1920 |
| 1,373,121 | Emery | Mar. 29, 1921 |
| 1,597,803 | Kearney | Aug. 31, 1926 |
| 1,812,242 | Jensen | Jan. 30, 1931 |
| 1,958,422 | Dinzl | May 15, 1934 |
| 1,990,260 | West | Feb. 5, 1935 |
| 2,014,468 | Clayton | Sept. 17, 1935 |
| 2,235,222 | Lauterbach | Mar. 18, 1941 |
| 2,353,276 | Stewart | July 11, 1944 |
| 2,469,892 | Rempel | May 10, 1949 |